(12) United States Patent
Matsuda et al.

(10) Patent No.: US 12,546,400 B2
(45) Date of Patent: Feb. 10, 2026

(54) THREE-WAY VALVE FOR FLOW RATE CONTROL AND TEMPERATURE CONTROL DEVICE

(71) Applicant: SHINWA CONTROLS CO., LTD., Kawasaki (JP)

(72) Inventors: Koji Matsuda, Kawasaki (JP); Ryoji Ichiyama, Kawasaki (JP); Shigehiko Ono, Kawasaki (JP)

(73) Assignee: SHINWA CONTROLS CO., LTD., Kawasaki (JP)

( * ) Notice: Subject to any disclaimer, the term of this patent is extended or adjusted under 35 U.S.C. 154(b) by 256 days.

(21) Appl. No.: 18/037,250

(22) PCT Filed: Nov. 30, 2021

(86) PCT No.: PCT/JP2021/043723
§ 371 (c)(1),
(2) Date: May 16, 2023

(87) PCT Pub. No.: WO2022/118804
PCT Pub. Date: Jun. 9, 2022

(65) Prior Publication Data
US 2023/0417331 A1 Dec. 28, 2023

(30) Foreign Application Priority Data
Dec. 2, 2020 (JP) .................................. 2020-200611

(51) Int. Cl.
*F16K 5/20* (2006.01)
*F16K 5/06* (2006.01)

(52) U.S. Cl.
CPC ............ *F16K 5/204* (2013.01); *F16K 5/0689* (2013.01)

(58) Field of Classification Search
CPC ........ F16K 5/204; F16K 5/0689; F16K 5/181; F16K 5/04; F16K 11/085
See application file for complete search history.

(56) References Cited

U.S. PATENT DOCUMENTS 6,966,537 B2 * 11/2005 Sundararajan ........ F16K 3/0227
                                                            251/175
8,113,484 B2 *  2/2012 Hostetter ................ F16K 5/204
                                                            251/174

(Continued)

FOREIGN PATENT DOCUMENTS

JP    2018-204680 A    12/2018
JP    2020-63787 A     4/2020

OTHER PUBLICATIONS

International Preliminary Report on Patentability and Written Opinion of the International Searching Authority for International Application No. PCT/JP2021/043723, dated Jun. 15, 2023, with an English translation.

(Continued)

*Primary Examiner* — Patrick C Williams
(74) *Attorney, Agent, or Firm* — Birch, Stewart, Kolasch & Birch, LLP

(57) ABSTRACT

Provided are a three-way valve for flow rate control and a temperature control device, which have improved sealing performance against a fluid having a low temperature of about −85° C. as compared to a case in which a pressure applying portion does not include a communication member having a cylindrical shape with both end portions in a longitudinal direction sealed by sealing means including a coating member, which has a substantially U-shaped cross section and is made of a synthetic resin, and is urged in an opening direction by a spring member made of a metal. The pressure applying portion includes the communication member having a cylindrical shape, which allows inner (Continued)

surfaces of first and second valve port forming members and first and second outflow ports to communicate with each other, and in which both end portions in the longitudinal direction are each sealed by the sealing means including the coating member, which has a substantially U-shaped cross section and is made of a synthetic resin, and is urged in the opening direction by the spring member made of a metal.

9 Claims, 20 Drawing Sheets

(56) References Cited

U.S. PATENT DOCUMENTS

| | | | | |
|---|---|---|---|---|
| 2006/0231786 | A1* | 10/2006 | Witt | F16K 5/0678 |
| | | | | 251/174 |
| 2011/0037010 | A1* | 2/2011 | Parks, Jr. | F16K 3/20 |
| | | | | 251/328 |
| 2012/0211690 | A1* | 8/2012 | Anderson | F16K 5/0694 |
| | | | | 251/315.1 |
| 2014/0239212 | A1* | 8/2014 | Haland | F16K 5/201 |
| | | | | 251/315.1 |
| 2016/0186870 | A1 | 6/2016 | Ricard et al. | |
| 2020/0124190 | A1 | 4/2020 | Kawamoto et al. | |
| 2020/0173565 | A1 | 6/2020 | Kusumoto et al. | |

OTHER PUBLICATIONS

International Search Report, issued in PCT/JP2021/043723, PCT/ISA/210, dated Jan. 25, 2022.
Written Opinion of the International Searching Authority, issued in PCT/JP2021/043723, PCT/ISA/237, dated Jan. 25, 2022.

* cited by examiner

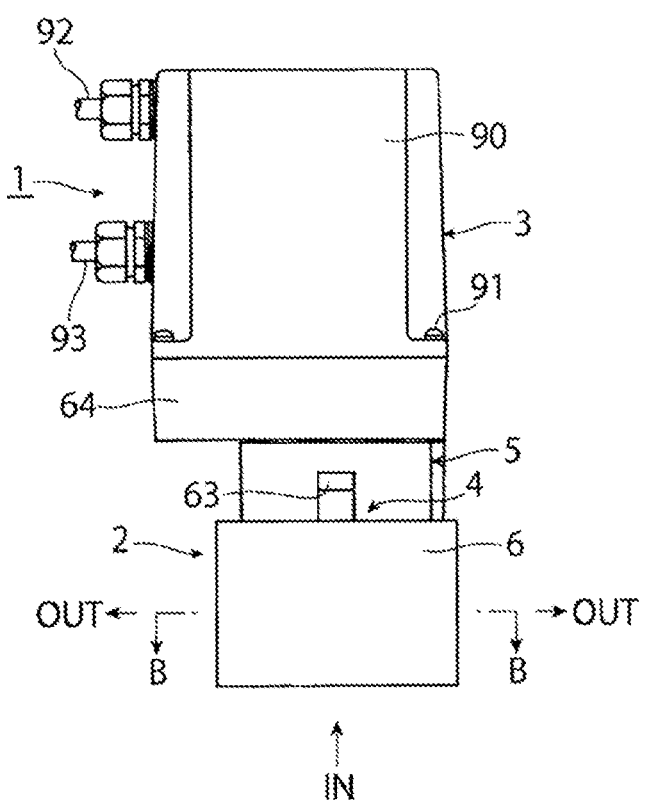

THREE-WAY VALVE FOR FLOW RATE CONTROL AND TEMPERATURE CONTROL DEVICE

TECHNICAL FIELD

The present invention relates to a three-way valve for flow rate control and a temperature control device.

BACKGROUND ART

Hitherto, as a technology relating to a three-way valve for flow rate control, the applicant of the present invention has already proposed a three-way valve for flow rate control disclosed in, for example, Patent Literature 1.

The three-way valve for flow rate control disclosed in Patent Literature 1 includes: a valve main body including a valve seat having a columnar space and having a first valve port and a second valve port, the first valve port having a rectangular cross section and allowing outflow of a fluid, the second valve port having a rectangular cross section and allowing outflow of the fluid; first and second valve port forming members, which are fitted to the valve main body to form the first and second valve ports, respectively; a valve body having a cylindrical shape and an opening, which is provided in a freely rotatable manner in the valve seat of the valve main body, and simultaneously switches the first valve port from a closed state to an opened state and switches the second valve port from an opened state to a closed state; a pressure applying portion, which applies pressure of the fluid leaking through a gap between the valve body and the valve seat to the first and second valve port forming members so as to suppress shift of a position of the valve body when the valve body opens and closes the first and second valve ports; and drive means for driving the valve body to rotate.

CITATION LIST

Patent Literature

[PTL 1] JP 2018-204680 A

SUMMARY OF INVENTION

Technical Problem

The present invention has an object to provide a three-way valve for flow rate control and a temperature control device, which have improved sealing performance against a fluid having a low temperature of about −85° C. as compared to a case in which a pressure applying portion does not include first and second flow passage forming members, which are members fitted to a valve main body to form first and second outflow ports, and in which both end portions of each of the first and second flow passage forming members in a longitudinal direction are sealed by sealing means, which has a substantially U-shaped cross section and is made of a synthetic resin, and is urged in an opening direction by a spring member made of a metal.

Solution to Problem

According to the invention of item 1, provided is a three-way valve for flow rate control, including: a valve main body including: a valve seat having a columnar space and having a first valve port and a second valve port, the first valve port having a rectangular cross section and allowing outflow of a fluid, the second valve port having a rectangular cross section and allowing outflow of the fluid; and first and second outflow ports, which allow outflow of the fluid from the first and second valve ports to an outside; first and second valve port forming members, which are fitted to the valve main body to form the first valve port and the second valve port, respectively; a valve body having a cylindrical shape and an opening, which is provided in a freely rotatable manner in the valve seat of the valve main body, and simultaneously switches the first valve port from a closed state to an opened state and switches the second valve port from an opened state to a closed state; a pressure applying portion configured to apply a pressure of the fluid leaking through a gap between the valve body and the valve seat to the first and second valve port forming members so as to suppress shift of a position of the valve body when the valve body opens and closes the first valve port and the second valve port; and drive means for driving the valve body to rotate, wherein the pressure applying portion includes first and second flow passage forming members, which are members fitted to the valve main body to form the first and second outflow ports, and in which both end portions of each of the first and second flow passage forming members in a longitudinal direction are sealed by sealing means, which has a substantially U-shaped cross section and is made of a synthetic resin, and is urged in an opening direction by a spring member made of a metal.

According to the invention of item 2, provided is a three-way valve for flow rate control, including: a valve main body including: a valve seat having a columnar space and having a first valve port and a second valve port, the first valve port having a rectangular cross section and allowing inflow of a first fluid, the second valve port having a rectangular cross section and allowing inflow of a second fluid; and first and second inflow ports, which allow inflow of the first fluid and the second fluid to the first and second valve ports from an outside; first and second valve port forming members, which are fitted to the valve main body to form the first valve port and the second valve port, respectively; a valve body having a cylindrical shape and an opening, which is provided in a freely rotatable manner in the valve seat of the valve main body, and simultaneously switches the first valve port from a closed state to an opened state and switches the second valve port from an opened state to a closed state; a pressure applying portion configured to apply pressures of the fluids leaking through a gap between the valve body and the valve seat to the first and second valve port forming members so as to suppress shift of a position of the valve body when the valve body opens and closes the first valve port and the second valve port; and drive means for driving the valve body to rotate, wherein the pressure applying portion includes first and second flow passage forming members, which are members fitted to the valve main body to form the first and second outflow ports, and in which both end portions of each of the first and second flow passage forming members in a longitudinal direction are sealed by sealing means, which has a substantially U-shaped cross section and is made of a synthetic resin, and is urged in an opening direction by a spring member made of a metal.

According to the invention of item 3, in the three-way valve for flow rate control according to item 1 or 2, one end portion of each of the first and second flow passage forming members in the longitudinal direction is sealed by first sealing means with respect to an inner surface of each of the first and second valve port forming members, and another end portion of each of the first and second flow passage forming members in the longitudinal direction is sealed by second sealing means with respect to an inner surface of the valve main body.

According to the invention of item 4, in the three-way valve for flow rate control according to item 3, the one end portion of each of the first and second flow passage forming members in the longitudinal direction has a cylindrical shape having a small thickness and is sealed by the first sealing means with respect to an inner peripheral surface of an end portion of each of the first and second valve port forming members, and the another end portion of each of the first and second flow passage forming members in the longitudinal direction has a cylindrical shape having a thickness larger than the thickness of the one end portion and is sealed by the second sealing means with respect to an inner peripheral surface of the valve main body.

According to the invention of item 5, in the three-way valve for flow rate control according to item 4, the first sealing means is arranged so as to be open toward the another end portion of each of the first and second flow passage forming members, and the second sealing means is arranged so as to be open toward the one end portion of each of the first and second flow passage forming members.

According to the invention of item 6, in the three-way valve for flow rate control according to item 5, the first sealing means is arranged in a stepped portion formed in an end surface of each of the first and second flow passage forming members on a side closer to the pressure applying portion, and wherein the three-way valve for flow rate control includes first and second pressure-receiving plates configured to close the stepped portions formed in the end surfaces of the first and second flow passage forming members on the sides closer to the pressure applying portion to allow the pressure to be applied by the pressure applying portion to the first and second valve port forming members.

According to the invention of item 7, in the three-way valve for flow rate control according to item 1, the sealing means includes an omniseal.

According to the invention of item 8, in the three-way valve for flow rate control according to item 7, wherein the sealing means includes a pair of the same omniseals that are arranged back-to-back.

According to the invention of item 9, provided is a temperature control device, including: temperature control means having a flow passage for temperature control, which allows a fluid for temperature control to flow therethrough, the fluid for temperature control including a lower temperature fluid and a higher temperature fluid adjusted in mixture ratio; first supply means for supplying the lower temperature fluid adjusted to a first predetermined lower temperature; second supply means for supplying the higher temperature fluid adjusted to a second predetermined higher temperature; mixing means, which is connected to the first supply means and the second supply means, for mixing the lower temperature fluid supplied from the first supply means and the higher temperature fluid supplied from the second supply means and supplying a mixture of the lower temperature fluid and the higher temperature fluid to the flow passage for temperature control; and a flow rate control valve configured to divide the fluid for temperature control having flowed through the flow passage for temperature control between the first supply means and the second supply means while controlling a flow rate of the fluid for temperature control, wherein the three-way valve for flow rate control of any one of items 1, 3 to 8 is used as the flow rate control valve.

According to the invention of item 10, provided is a temperature control device, including: temperature control means having a flow passage for temperature control, which allows a fluid for temperature control to flow therethrough, the fluid for temperature control including a lower temperature fluid and a higher temperature fluid adjusted in mixture ratio; first supply means for supplying the lower temperature fluid adjusted to a first predetermined lower temperature; second supply means for supplying the higher temperature fluid adjusted to a second predetermined higher temperature; a flow rate control valve, which is connected to the first supply means and the second supply means, for flowing, to the flow passage for temperature control, the lower temperature fluid supplied from the first supply means and the higher temperature fluid supplied from the second supply means while adjusting the mixture ratio thereof, wherein the three-way valve for flow rate control of any one of items 2 to 8 is used as the flow rate control valve.

Advantageous Effects of Invention

According to the present invention, there can be provided the three-way valve for flow rate control and the temperature control device, which have the improved sealing performance against the fluid having a low temperature of about −85° C. as compared to the case in which the pressure applying portion does not include the first and second flow passage forming members, which are members fitted to the valve main body to form the first and second outflow ports, and in which both end portions of each of the flow passage forming members in the longitudinal direction are sealed by the sealing means, which has a substantially U-shaped cross section and is made of a synthetic resin, and is urged in the opening direction by the spring member made of a metal.

BRIEF DESCRIPTION OF DRAWINGS

FIG. 1(a) is a front view for illustrating a three-way motor valve as one example of a three-way valve for flow rate control according to a first embodiment of the present invention.

DESCRIPTION OF EMBODIMENTS

In the following, embodiments of the present invention are described with reference to the drawings.

First Embodiment

Figure 1B:
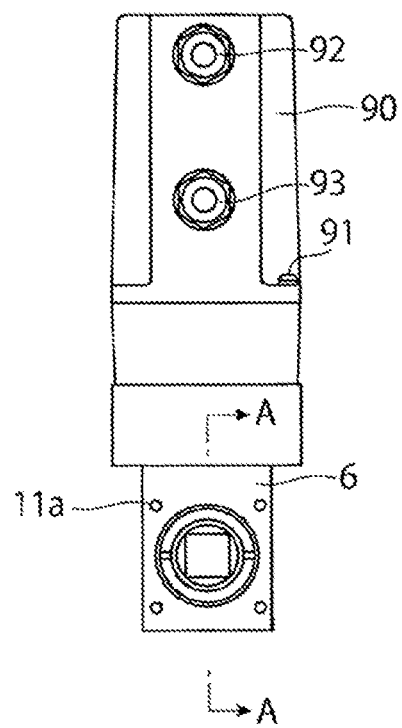
FIG. 1(b) is a right side view for illustrating the three-way motor valve as one example of the three-way valve for flow rate control according to the first embodiment of the present invention.
Figure 1C:
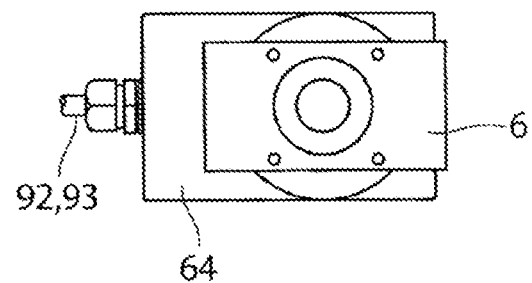
FIG. 1(c) is a bottom view for illustrating an actuator portion of the three-way motor valve as one example of the three-way valve for flow rate control according to the first embodiment of the present invention.
Figure 2:
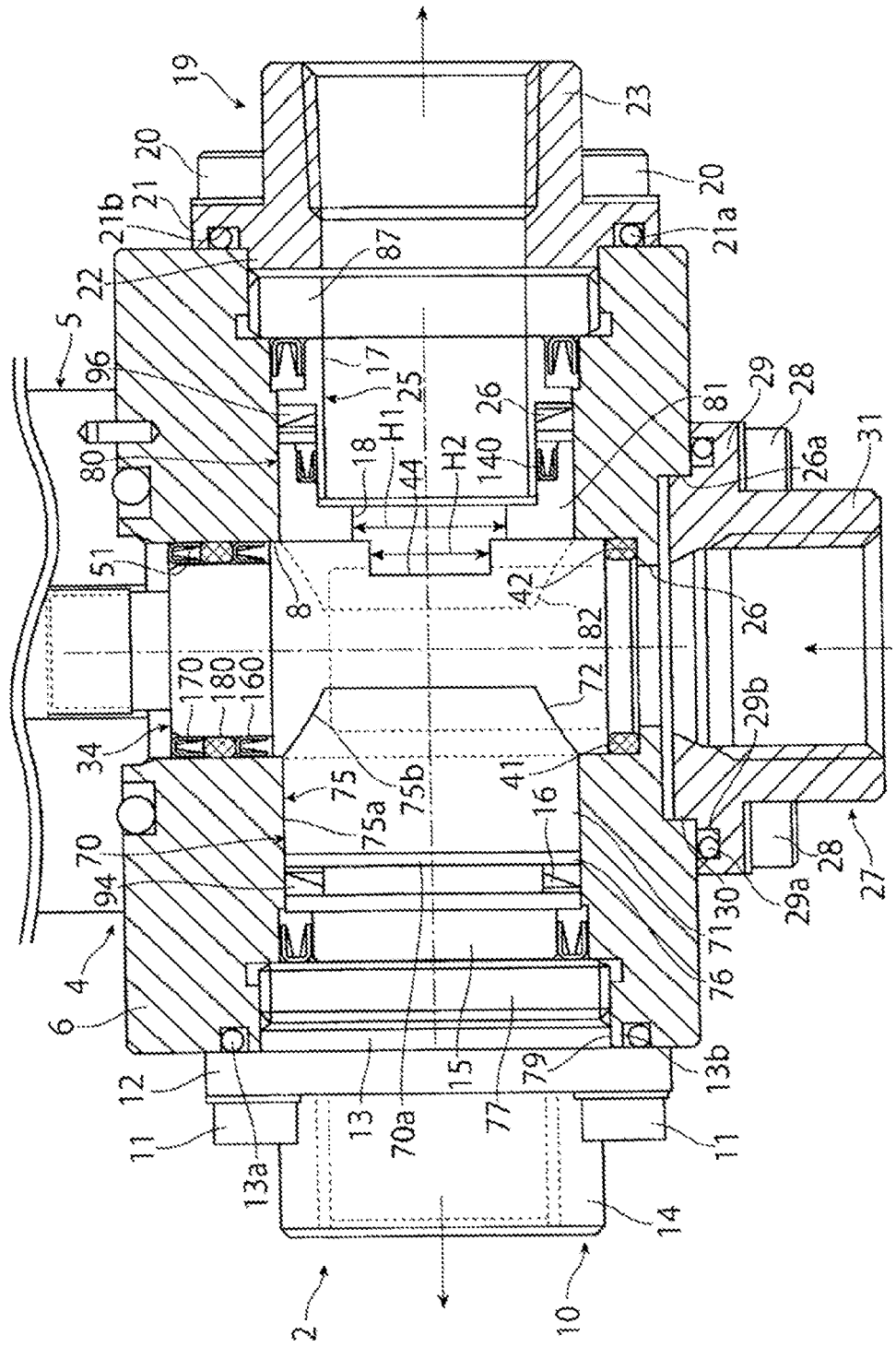
FIG. 2 is a sectional view taken along the line A-A of FIG. 1(b), for illustrating the three-way motor valve as one example of the three-way valve for flow rate control according to the first embodiment of the present invention.
Figure 3:
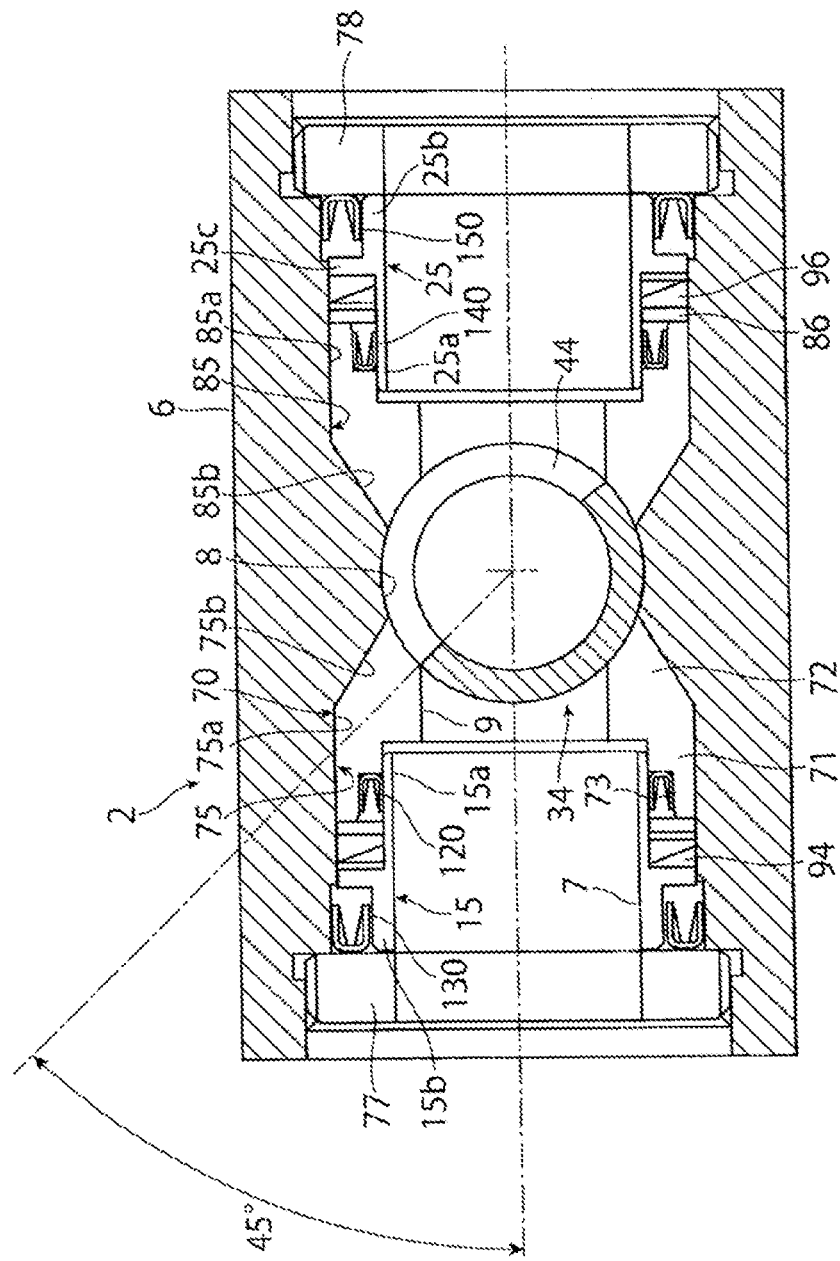
FIG. 3 is a sectional view taken along the line B-B of FIG. 1(a), for illustrating the three-way motor valve as one example of the three-way valve for flow rate control according to the first embodiment of the present invention.
Figure 4:
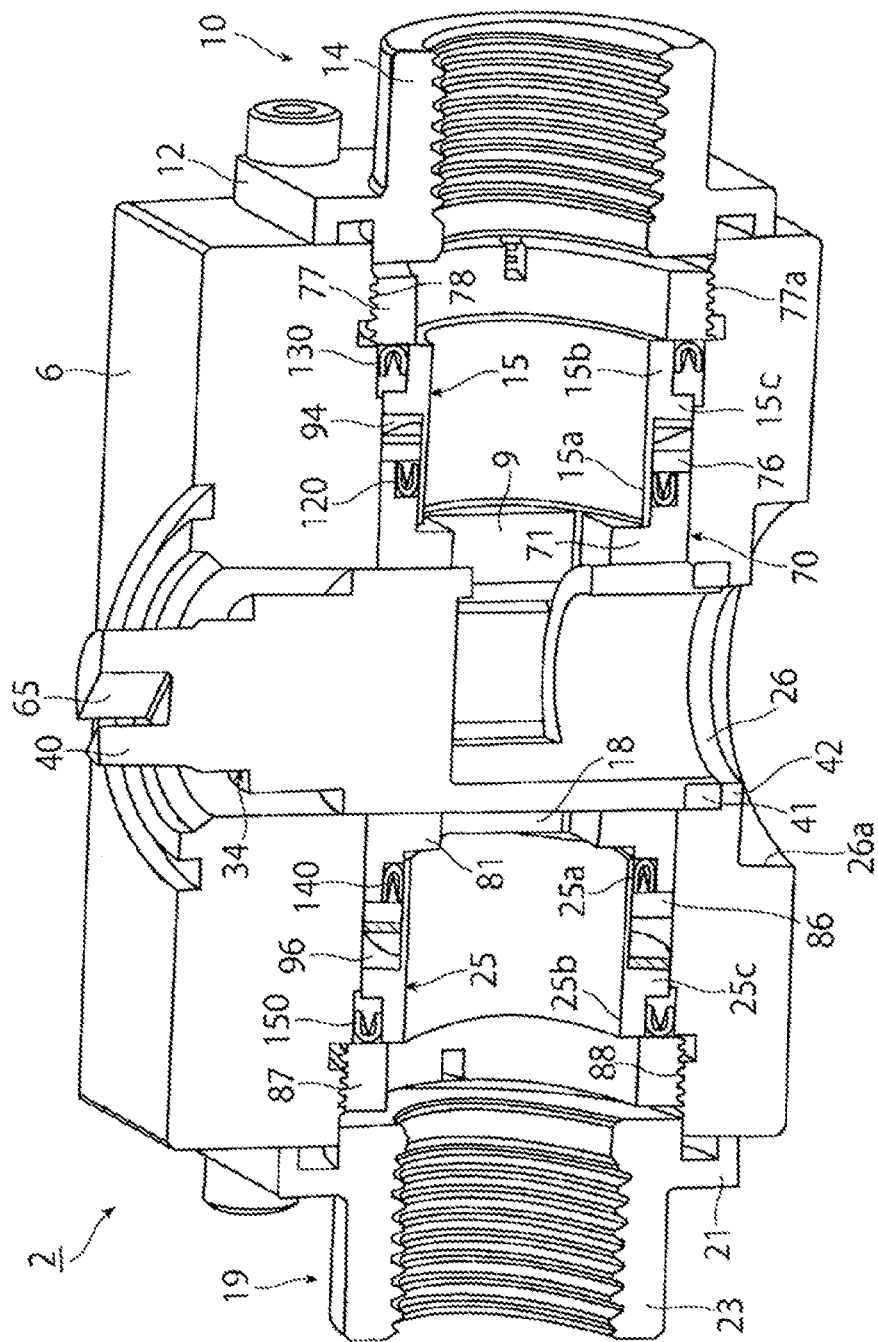
FIG. 4 is a sectional perspective view for illustrating main parts of the three-way motor valve as one example of the three-way valve for flow rate control according to the first embodiment of the present invention.

FIG. 1(a) is a front view for illustrating a three-way motor valve as one example of a three-way valve for flow rate control according to a first embodiment of the present invention. FIG. 1(b) is a left side view for illustrating the three-way motor valve. FIG. 1(c) is a bottom view for illustrating the three-way motor valve. FIG. 2 is a sectional view taken along the line A-A of FIG. 1(b). FIG. 3 is a sectional view taken along the line B-B of FIG. 1(a). FIG. 4 is a sectional perspective view for illustrating main parts of the three-way motor valve.

A three-way motor valve 1 is constructed as a rotary three-way valve. As illustrated in FIGS. 1, the three-way motor valve 1 mainly includes a valve portion 2 arranged at a lower portion thereof, an actuator portion 3 arranged at an upper portion thereof, and a sealing portion 4 and a coupling portion 5, which are arranged between the valve portion 2 and the actuator portion 3.

As illustrated in FIG. 2 to FIG. 4, the valve portion 2 includes a valve main body 6 obtained by forming metal, for example, SUS, into a substantially rectangular parallelepiped shape. As illustrated in FIG. 2 and FIG. 3, a first outflow port 7 and a first valve port 9 are formed in one side surface (left side surface in the illustrated example) of the valve main body 6. The first outflow port 7 allows outflow of a fluid. The first valve port 9 as one example of a communication port has a rectangular cross section, and communicates with a valve seat 8 having a columnar space.

In the first embodiment of the present invention, instead of directly forming the first outflow port 7 and the first valve port 9 in the valve main body 6, a first valve seat element 70 as one example of a first valve port forming member forming the first valve port 9, and a first flow passage forming member 15 forming the first outflow port 7 are fitted to the valve main body 6, thereby providing the first outflow port 7 and the first valve port 9.

Figure 5A:
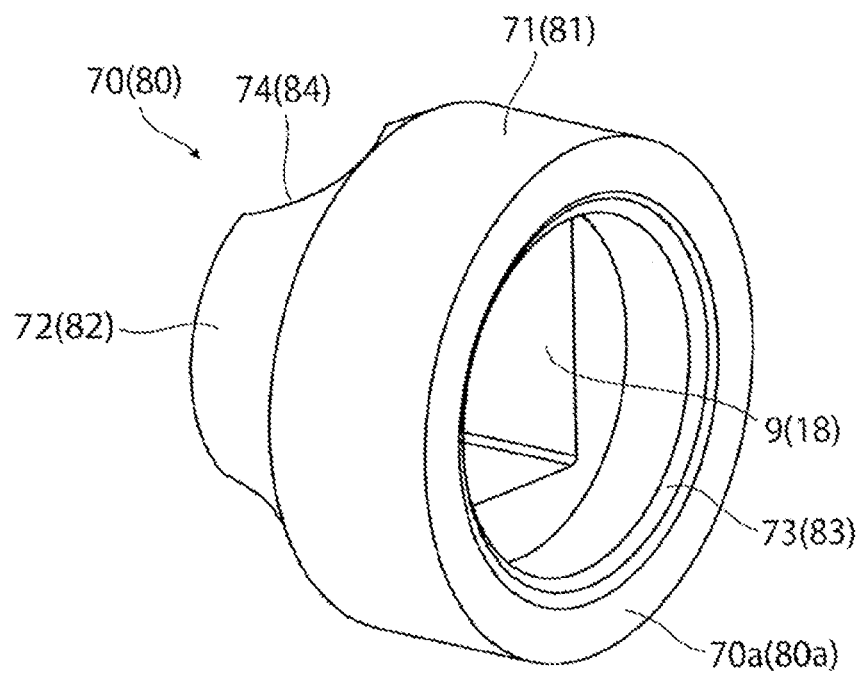
FIG. 5(a) is a perspective configuration view for illustrating a valve seat element.

As illustrated in FIGS. 5, the first valve seat element 70 integrally includes a cylindrical portion 71 and a tapered portion 72. The cylindrical portion 71 has a cylindrical shape and is provided on an outer side of the valve main body 6. The tapered portion 72 has a tapered shape so that an outer diameter of a distal end thereof decreases toward an inner side of the valve main body 6. The first valve port 9 is formed in the tapered portion 72 of the first valve seat element 70, and has a rectangular prism shape having a rectangular cross section (square cross section in the first embodiment of the present invention). Further, as described later, one end portion of the first flow passage forming member 15 forming the first outflow port 7 is inserted under a hermetically sealed (sealed) state into the cylindrical portion 71 of the first valve seat element 70.

As a material for the first valve seat element 70, for example, a polyimide (PI) resin is used. Further, as a material for the first valve seat element 70, for example, so-called "super engineering plastic" can be used. The super engineering plastic has higher heat resistance and higher mechanical strength under a high temperature than ordinary engineering plastic. Examples of the super engineering plastic include, for example, polyether ether ketone (PEEK), polyphenylene sulfide (PPS), polyether sulfone (PES), polyamide imide (PAI), a liquid crystal polymer (LCP), polytetrafluoroethylene (PTFE), polychlorotrifluoroethylene (PCTFE), polyvinylidene fluoride (PVDF), or composite materials thereof. Further, as the material for the first valve seat element 70, there can be used, for example, "TECAPEEK" (trademark) manufactured by Ensinger Japan Co., Ltd. serving as a PEEK resin material for cutting work, and "TECAPEEK TF 10 blue" (product name) having blending therein 10% PTFE, which is excellent in sliding property, can also be used.

As illustrated in FIG. 3 and FIG. 4, a recess 75 is formed in the valve main body 6 by, for example, machining. The recess 75 has a shape corresponding to an outer shape of the first valve seat element 70 and similar to the shape of the valve seat element 70. The recess 75 includes a cylindrical portion 75a corresponding to the cylindrical portion 71 of the first valve seat element 70 and a tapered portion 75*b* corresponding to the tapered portion 72. A length of the cylindrical portion 75*a* of the valve main body 6 is set larger than a length of the cylindrical portion 71 of the first valve seat element 70. As described later, the cylindrical portion 75*a* of the valve main body 6 forms a part of a first pressure applying portion 94. The first valve seat element 70 is fitted to the recess 75 of the valve main body 6 so as to be movable in a direction of moving close to and away from a valve shaft 34 serving as a valve body.

Under a state in which the first valve seat element 70 is fitted to the recess 75 of the valve main body 6, a slight gap is defined between an outer peripheral surface of the first valve seat element 70 and an inner peripheral surface of the recess 75 of the valve main body 6. A fluid having flowed into the valve seat 8 may leak and flow into a region around an outer periphery of the first valve seat element 70 through the slight gap. Further, the fluid having leaked into the region around the outer periphery of the first valve seat element 70 is led into the first pressure applying portion 94 being a space defined on an outer side of the cylindrical portion 71 of the first valve seat element 70. The first pressure applying portion 94 is configured to apply a pressure of the fluid to a surface 70*a* of the first valve seat element 70 opposite to the valve shaft 34. As described later, the fluid flowing into the valve seat 8 is a fluid flowing out through a second valve port 18 as well as a fluid flowing out through the first valve port 9. The first pressure applying portion 94 is partitioned under a state in which the first flow passage forming member 15 hermetically seals the first pressure applying portion 94 with respect to the first outflow port 7.

The pressure of the fluid, which is to be applied to the valve shaft 34 arranged inside the valve seat 8, depends on a flow rate of the fluid determined by an opening/closing degree of the valve shaft 34. The fluid flowing into the valve seat 8 also flows (leaks) through the first valve port 9 and the second valve port 18 into a slight gap defined between the valve seat 8 and an outer peripheral surface of the valve shaft 34. Therefore, into the first pressure applying portion 94 adapted for the first valve seat element 70, not only the fluid flowing out through the first valve port 9 flows (leaks), but also the fluid flowing into the slight gap defined between the valve seat 8 and the outer peripheral surface of the valve shaft 34 and flowing out through the second valve port 18 flows (leaks).

As illustrated in FIG. 5(*b*), a concave portion 74 is formed at a distal end of the tapered portion 72 of the first valve seat element 70. The concave portion 74 is one example of a gap reducing portion having an arc shape in plan view, which forms part of a curved surface of a columnar shape corresponding to the valve seat 8 having a columnar shape in the valve main body 6. A curvature radius R of the concave portion 74 is set to a value substantially equal to a curvature radius of the valve seat 8 or a curvature radius of the valve shaft 34. In order to prevent biting of the valve shaft 34 to be rotated inside the valve seat 8, the valve seat 8 of the valve main body 6 defines a slight gap with respect to the outer peripheral surface of the valve shaft 34. As illustrated in FIG. 6, the concave portion 74 of the first valve seat element 70 is fitted so as to protrude toward the valve shaft 34 side more than the valve seat 8 of the valve main body 6 or so as to be brought into contact with the outer peripheral surface of the valve shaft 34 under a state in which the first valve seat element 70 is fitted to the valve main body 6. As a result, a gap G between the valve shaft 34 and an inner surface of the valve seat 8 of the valve main body 6 being a member opposed to the valve shaft 34 partially becomes a value reduced by the protruding amount of the concave portion 74 of the first valve seat element 70 as compared to that of a gap between the valve shaft 34 and another portion of the valve seat 8. Thus, a gap G1 between the concave portion 74 of the first valve seat element 70 and the valve shaft 34 is set to a desired value (G1<G2) smaller than (or a gap narrower than) a gap G2 between the valve shaft 34 and the inner surface of the valve seat 8. The gap G1 between the concave portion 74 of the first valve seat element 70 and the valve shaft 34 may correspond to a state in which the concave portion 74 of the valve seat element 70 is brought into contact with the valve shaft 34, that is, a state in which no gap is defined (the gap G1=0).

However, in a case in which the concave portion 74 of the first valve seat element 70 is brought into contact with the valve shaft 34, there is a fear in that driving torque of the valve shaft 34 is increased due to contact resistance of the concave portion 74 when the valve shaft 34 is driven to rotate. Accordingly, a contact degree of the concave portion 74 of the first valve seat element 70 with the valve shaft 34 is adjusted in consideration of rotational torque of the valve shaft 34. That is, the contact degree is adjusted to such an extent as to involve no increase in the driving torque of the valve shaft 34 or involve slight increase even when the driving torque is increased, and cause no trouble for rotation of the valve shaft 34.

As illustrated in FIG. 3 and FIG. 4, the first flow passage forming member 15 is made of a metal such as SUS or a synthetic resin such as a polyimide (PI) resin and has a cylindrical shape. The first flow passage forming member 15 has the first outflow port 7 formed therein to communicate with the first valve port 9 irrespective of shift of a position of the first valve seat element 70. About one-half of the first flow passage forming member 15 on the first valve seat element 70 side is formed as a small-thickness cylindrical portion 15*a* having a cylindrical shape with a relatively small thickness. Further, about one-half of the first flow passage forming member 15 on a side opposite to the first valve seat element 70 is formed as a large-thickness cylindrical portion 15*b* having a cylindrical shape with a thickness larger than the thickness of the portion having the cylindrical shape with a small thickness. An inner surface of the first flow passage forming member 15 extends to form a cylindrical shape. A flange portion 15*c* having an annular shape is formed at an outer periphery of the first flow passage forming member 15 so as to be located between the small-thickness cylindrical portion 15*a* and the large-thickness cylindrical portion 15*b*. The flange portion 15*c* has a relatively large thickness so as to extend outward in a radial direction. The flange portion 15*c* is arranged so that its outer peripheral end is in movable contact with the inner peripheral surface of the recess 75.

As illustrated in FIGS. 3, a space between the cylindrical portion 71 of the first valve seat element 70 and the small-thickness cylindrical portion 15*a* of the first flow passage forming member 15 is hermetically sealed (sealed) by an omniseal 120 corresponding to one example of first sealing means. The first sealing means has a substantially U-shaped cross section and is made of a synthetic resin, and is urged in an opening direction by a spring member made of a metal. As illustrated in FIGS. 5, a stepped portion 73 that receives the omniseal 120 is formed in an end portion of an inner peripheral surface of the cylindrical portion 71 of the first valve seat element 70 on the outer side of the valve main body 6.

Figure 7A:
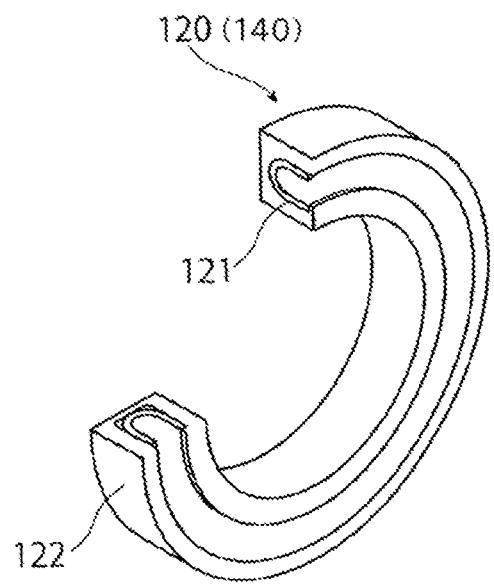
FIG. 7(a) is a partially cutaway perspective configuration view for illustrating an omniseal.
Figure 7B:
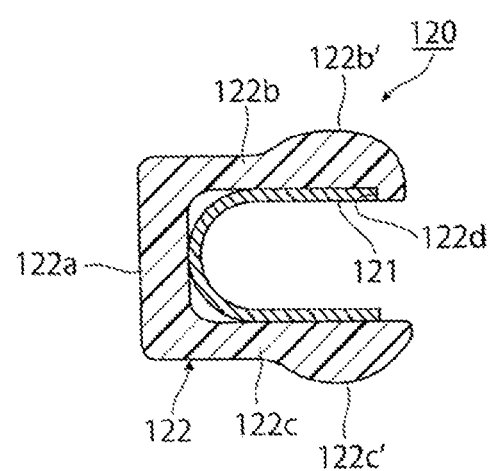
FIG. 7(b) is a sectional configuration view for illustrating the omniseal.
Figure 8:
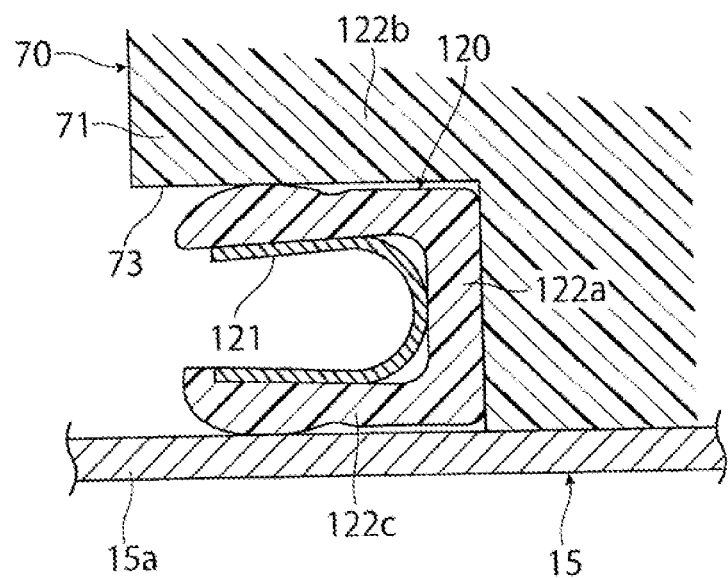
FIG. 8 is a sectional view for illustrating a state in which the omniseal is fitted.

As illustrated in FIGS. 7, the omniseal 120 is an annular (ring-shaped) member arranged on the inner peripheral surface of the cylindrical portion 71 of the first valve seat element 70 so as to extend over its entire periphery. The omniseal 120 includes a spring member 121 and a sealing member 122. The spring member 121 has a substantially U-shaped cross section and is made of a metal such as stainless steel. The sealing member 122 has a substantially U-shaped cross section and is made of a synthetic resin such as polytetrafluoroethylene (PTFE), and is urged in the opening direction by the spring member 121. The spring member 121 is made of a metal such as stainless steel and has a substantially U-shaped cross section. An elastic modulus of the spring member 121 is adjusted by forming slits or grooves at predetermined intervals in a longitudinal direction or appropriately setting a thickness. As illustrated in FIG. 7 and FIG. 8, the sealing member 122 has a proximal end portion 122a and two lip portions 122b and 122c. The proximal end portion 122a is arranged in a sealing direction so as to be located in a space to be sealed between the stepped portion 73 formed in the cylindrical portion 71 of the first valve seat element 70 and the small-thickness cylindrical portion 15a of the first flow passage forming member 15. The two lip portions 122b and 122c extend from both ends of the proximal end portion 122a in the same direction (toward an outer side in an axial direction of the first valve seat element 70) along peripheral surfaces of the two members to be sealed and are arranged in parallel so as to be opposed to each other. Distal ends of the two lip portions 122b and 122c extend toward the outer side in the axial direction of the first valve seat element 70 to thereby define an opening. An opening of the omniseal 120 is directed toward the first pressure applying portion 94 and is subjected to a pressure applied by the first pressure applying portion 94. As illustrated in FIG. 7(b), a protruding portion 122d that prevents removal of the spring member 121 is formed at the distal end of one lip portion 122b. The protruding portion 122d has a thickness corresponding to a thickness of the spring member 121, and protrudes inward. Outer peripheral surfaces of distal end portions 122b' and 122c' of the lip portions 122b and 122c each have such an arc-like curved shape that a part thereof from an intermediate portion to the distal end protrudes outward in the radial direction. The distal end portions 122b' and 122c' of the lip portions 122b and 122c are in close contact with an inner peripheral surface of the first valve seat element 70 and an outer peripheral surface of the first flow passage forming member 15 to thereby achieve a higher degree of hermetic sealing.

Figure 9:
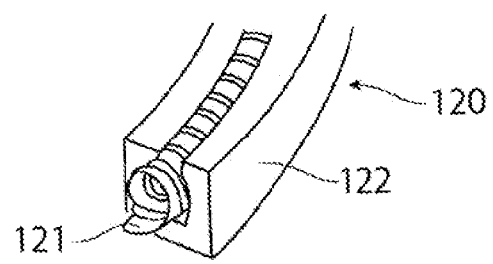
FIG. 9 is a configuration view for illustrating a modification example of the omniseal.

The spring member 121 of the omniseal 120 is not limited to the one having a substantially U-shaped cross section. As illustrated in FIG. 9, the spring member 121 may be a metal band formed in a helical shape with a circular cross section or an elliptical cross section.

When a pressure of a fluid is not applied or the pressure of the fluid is relatively low, the omniseal 120 hermetically seals a gap between the first valve seat element 70 and the first flow passage forming member 15 with use of an elastic restoring force of the spring member 121. Meanwhile, when the pressure of the fluid is relatively high, the omniseal 120 hermetically seals the gap between the first valve seat element 70 and the first flow passage forming member 15 with use of the elastic restoring force of the spring member 121 and the pressure of the fluid. Thus, when the fluid flows into the first pressure applying portion 94 through the gap between the inner peripheral surface of the valve main body 6 and the outer peripheral surface of the first valve seat element 70, the fluid does not flow into the first flow passage forming member 15 through the gap between the first valve seat element 70 and the first flow passage forming member 15, which is sealed by the omniseal 120.

The omniseal 120 includes a combination of the spring member 121 made of a metal and the sealing member 122 made of a synthetic resin. Not only the spring member 121 made of a metal but also polytetrafluoroethylene (PTFE), which is a synthetic resin for forming the sealing member 122, is excellent in heat resistance. Thus, the omniseal 120 is resistant to long time use at a temperature in an ultralow temperature range.

As illustrated in FIG. 2 and FIG. 3, the end surface 70a of the cylindrical portion 71 of the first valve seat element 70 corresponds to a region (pressure-receiving surface) being subjected to the pressure of the fluid, which is applied by the first pressure applying portion 94.

In the first embodiment of the present invention, the stepped portion 73 into which the omniseal 120 is to be fitted is formed in the end surface 70a of the cylindrical portion 71 of the first valve seat element 70. Thus, the end surface 70a of the cylindrical portion 71 of the first valve seat element 70 has a structure that is less likely to be subjected to a full pressure of the fluid applied by the first pressure applying portion 94 due to the presence of the stepped portion 73.

Thus, in the first embodiment of the present invention, as illustrated in FIG. 2 and FIG. 3, a first pressure-receiving plate 76 having an annular shape is provided so that the pressure of the fluid is effectively applied by the first pressure applying portion 94 to the end surface 70a of the cylindrical portion 71 of the first valve seat element 70. The first pressure-receiving plate 76 achieves closing by covering the end surface 70a of the cylindrical portion 71 of the first valve seat element 70, which has the stepped portion 73 of the first valve seat element 70. Specifically, the pressure-receiving plate 76 is arranged so as to be in contact with the end surface 70a of the cylindrical portion 71 of the first valve seat element 70 and close the stepped portion 73. The first pressure-receiving plate 76 is made of the same material as that of the first valve seat element 70. Further, a slight gap that allows the fluid to leak into the first pressure applying portion 94 is set between an outer peripheral end surface of the first pressure-receiving plate 76, which extends in the radial direction, and the recess 75 of the valve main body 6.

Meanwhile, a space between an end portion of the large-thickness cylindrical portion 15b, which is another end portion of the first flow passage forming member 15, and the inner peripheral surface of the valve main body 6 is hermetically sealed by a second omniseal 130 corresponding to one example of second sealing means. The second sealing means has a substantially U-shaped cross section and is made of a synthetic resin, and is urged in an opening direction by a spring member made of a metal. As illustrated in FIGS. 3, a cylindrical portion 75c for fitting the omniseal 130 thereto is formed with a short length on the inner peripheral surface of the valve main body 6. The omniseal 130 having an outer diameter slightly larger than that of the cylindrical portion 75a of the recess 75 is formed at an outer end portion in an axial direction of the cylindrical portion 75a of the recess 75. The length of the cylindrical portion 75c is set larger than a length of the second omniseal 130.

A gap between the cylindrical portion 75c of the valve main body 6 and the large-thickness cylindrical portion 15b of the first flow passage forming member 15 is hermetically sealed (sealed) by the second omniseal 130. The second omniseal 130 is open toward the first pressure applying portion 94. Specifically, the second omniseal 130 is arranged so that its opening is subjected to the pressure of the fluid, which is applied by the first pressure applying portion 94. The second omniseal 130 has an outer diameter larger than that of the first omniseal 120. However, the second omniseal 130 basically has a configuration similar to the configuration of the first omniseal 120.

Figure 10A:
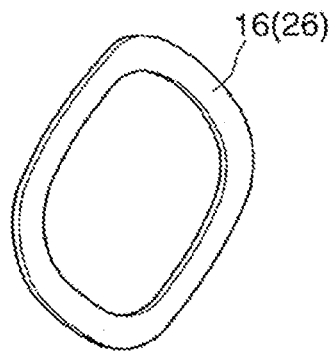
FIG. 10(a) is a perspective configuration view for illustrating a wave washer.
Figure 10B:
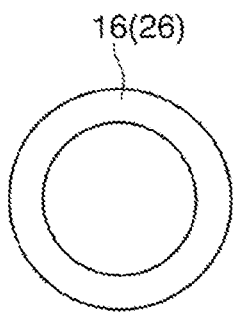
FIG. 10(b) is a front view for illustrating the wave washer.
Figure 10C:
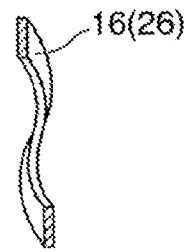
FIG. 10(c) is a partially cutaway side view for illustrating the wave washer.

A first wave washer (corrugated washer) 16 is provided on the outer side of the cylindrical portion 71 of the first valve seat element 70 along an axial direction thereof. The first wave washer 16 is one example of an elastic member configured to elastically deform the first valve seat element 70 in the direction of moving close to and away from the valve shaft 34 while allowing displacement of the first valve seat element 70 in the direction of moving close to and away from the valve shaft 34. As illustrated in FIGS. 10, the first wave washer 16 is made of, for example, stainless steel, iron, or phosphor bronze, and has an annular shape having a desired width when a front side thereof is projected. Further, a side surface of the first wave washer 16 is formed into a wavy (corrugated) shape, and the first wave washer 16 is elastically deformable in a thickness direction thereof. An elastic modulus of the first wave washer 16 is determined by, for example, the thickness, a material, or the number of waves of the first wave washer 16. The first wave washer 16 is received in the first pressure applying portion 94.

Figure 11:
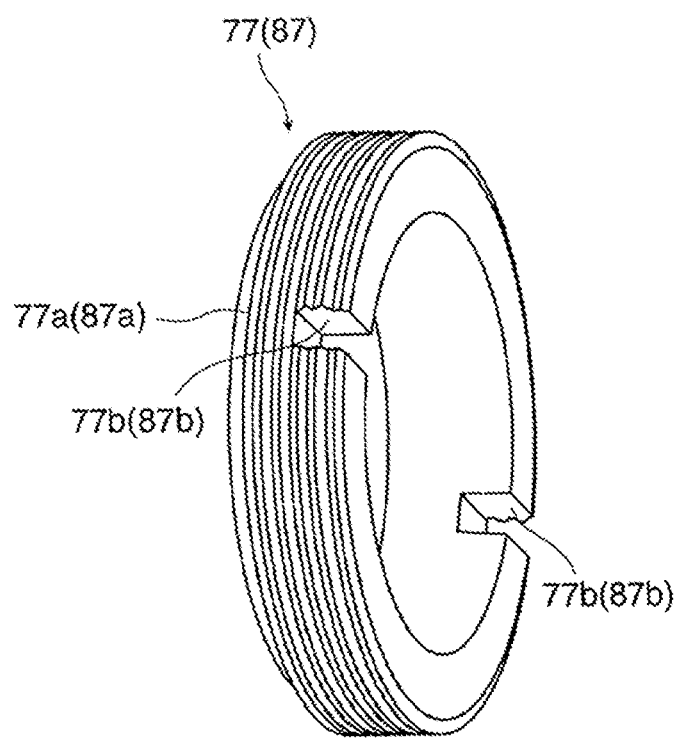
FIG. 11 is a perspective configuration view for illustrating an adjusting ring.

Moreover, a first adjusting ring 77 is arranged on an outer side of the first wave washer 16. The first adjusting ring 77 is one example of an annular adjusting member configured to adjust the gap G1 between the valve shaft 34 and the concave portion 74 of the first valve seat element 70 via the first wave washer 16. As illustrated in FIG. 11, the first adjusting ring 77 is made of a metal such as SUS or a synthetic resin such as a polyimide (PI) resin having heat resistance, and is formed of a cylindrical member having a relatively small length and a male thread 77*a* formed in an outer peripheral surface thereof. Recessed grooves 77*b* are formed in an outer end surface of the first adjusting ring 77 so as to be 180 degrees opposed to each other. When the first adjusting ring 77 is fastened and fitted into a female thread portion 78 formed in the valve main body 6, a jig (not shown) for adjusting a fastening amount is locked to the recessed grooves 77*b* so as to turn the first adjusting ring 77.

As illustrated in FIG. 4, the first female thread portion 78 for fitting the first adjusting ring 77 is formed in the valve main body 6. A cylindrical portion 79 having a short length is formed at an opening end portion of the valve main body 6, and has an outer diameter substantially equal to an outer diameter of the first adjusting ring 77. Further, a cylindrical portion 75*d* for processing having an inner diameter larger than that of the first thread portion 78 is formed with a short length between the first female thread portion 78 of the valve main body 6 and the cylindrical portion 75*c* so as to enable processing for forming the first female thread portion 78 over a required length.

The first adjusting ring 77 is configured to adjust an amount (distance) of pushing and moving the first valve seat element 70 inward by the first adjusting ring 77 through adjustment of a fastening amount of the first adjusting ring 77 with respect to the female thread portion 78 of the valve main body 6. When the fastening amount of the first adjusting ring 70 is increased, as illustrated in FIG. 6, the first valve seat element 70 is pushed by the first adjusting ring 77 via the first wave washer 16 and the first pressure-receiving plate 76 so that the concave portion 74 protrudes from an inner peripheral surface of the valve seat 8 and is displaced in a direction of approaching the valve shaft 34. Thus, the gap G1 between the concave portion 74 and the valve shaft 34 is reduced. Further, when the fastening amount of the first adjusting ring 77 is set to a small amount in advance, the distance of pushing and moving the first valve seat element 70 by the first adjusting ring 77 is reduced. As a result, the first valve seat element 70 is arranged apart from the valve shaft 34, and the gap G1 between the concave portion 74 of the first valve seat element 70 and the valve shaft 34 is relatively increased. The male thread 77*a* of the first adjusting ring 77 and the female thread portion 78 of the valve main body 6 are each set to have a small pitch. With this configuration, a protruding amount of the first valve seat element 70 can be finely adjusted.

Further, as illustrated in FIG. 2, a first flange member 10 as an example of a connecting member, which is configured to connect a pipe, or the like (not shown), for allowing outflow of the fluid, is mounted to one side surface of the valve main body 6 with four hexagon socket head cap screws 11. In FIG. 9, a reference symbol 11*a* denotes a screw hole in which the hexagon socket head cap screw 11 is fastened. Similarly to the valve main body 6, the first flange member 10 is made of metal, for example, SUS. The first flange member 10 includes a flange portion 12, an insertion portion 13, and a pipe connecting portion 14. The flange portion 12 has a side surface having substantially the same rectangular shape as the side surface of the valve main body 6. The insertion portion 13 has a cylindrical shape with a short length and protrudes from an inner surface of the flange portion 12. The pipe connecting portion 14 has a substantially cylindrical shape having a large thickness and protrudes from an outer surface of the flange portion 12. A pipe (not shown) is connected to the pipe connecting portion 14. As illustrated in FIG. 2, a space between the flange portion 12 of the first flange member 10 and the valve main body 6 is hermetically sealed by an O-seal 13*a*. A recessed groove 13*b* configured to receive the O-seal 13*a* is formed in an inner peripheral surface of the flange portion 12 of the first flange member 10. An inner periphery of the pipe connecting portion 14 is set to, for example, Rc 1/2 being a standard for a tapered female thread having a bore diameter of about 21 mm, or a female thread having a diameter of about 0.58 inches. The shape of the pipe connecting portion 14 is not limited to the tapered female thread or the female thread. The pipe connecting portion 14 may have, for example, a tube fitting shape that allows a tube to be fitted thereto. The pipe connecting portion 14 may have any shape as long as the pipe connecting portion 14 enables inflow of a fluid through the first outflow port 7.

The O-seal 13*a* is an O-ring-shaped sealing member and is formed by fully covering an outer side of a spring member with an elastically deformable synthetic resin including, for example, Teflon (trademark) FEP (copolymer of tetrafluoroethylene and hexafluoropropylene). The spring member is made of, for example, stainless steel and is formed in a helical shape with a circular cross section or an elliptical cross section. The O-seal 13*a* can maintain its hermetic sealing performance even at a temperature within an ultralow temperature range.

As illustrated in FIG. 2, a second outflow port 17 and the second valve port 18 are formed in another side surface (right side surface in FIG. 2) of the valve main body 6. The second outflow port 17 allows outflow of a fluid. The second valve port 18 as one example of a communication port has a rectangular cross section, and communicates with the valve seat 8 having the columnar space.

In the first embodiment of the present invention, instead of directly forming the second outflow port 17 and the second valve port 18 in the valve main body 6, a second valve seat element 80 as one example of a valve port forming member forming the second valve port 18, and a second flow passage forming member 25 forming the second outflow port 17 are fitted to the valve main body 6, thereby providing the second outflow port 17 and the second valve port 18.

The second valve seat element 80 has a configuration similar to the configuration of the first valve seat element 70 as illustrated in FIG. 5 with the reference symbol of the second valve seat element 80 put in parentheses. Specifically, the second valve seat element 80 integrally includes a cylindrical portion 81 and a tapered portion 82. The cylindrical portion 81 has a cylindrical shape and is arranged on the outer side of the valve main body 6. The tapered portion 82 has a tapered shape so that its outer diameter decreases toward the inner side of the valve main body 6. The second valve port 18 is formed in the tapered portion 82 of the second valve seat element 80, and has a rectangular prism shape having a rectangular cross section (square cross section in the first embodiment of the present invention). Further, one end portion of the second flow passage forming member 25 forming the second outflow port 17 is inserted in a hermetically sealed state into the cylindrical portion 81 of the second valve seat element 80.

As illustrated in FIG. 3, a recess 85 is formed in the valve main body 6 by, for example, machining. The recess 85 has a shape corresponding to an outer shape of the second valve seat element 80 and similar to the shape of the valve seat element 80. The recess 85 includes a cylindrical portion 85a corresponding to the cylindrical portion 81 of the second valve seat element 80 and a tapered portion 85b corresponding to the tapered portion 82. A length of the cylindrical portion 85a of the valve main body 6 is set larger than a length of the cylindrical portion 81 of the second valve seat element 80. As described later, the cylindrical portion 85a of the valve main body 6 forms a second pressure applying portion 96. The second valve seat element 80 is fitted to the recess 85 of the valve main body 6 so as to be movable in a direction of moving close to and away from the valve shaft 34 serving as a valve body.

Under a state in which the second valve seat element 80 is fitted to the recess 85 of the valve main body 6, a slight gap is defined between the second valve seat element 80 and the recess 85 of the valve main body 6. A fluid having flowed into the valve seat 8 can flow into a region around an outer periphery of the second valve seat element 80 through the slight gap. Further, the fluid having flowed into the region around the outer periphery of the second valve seat element 80 is led into the second pressure applying portion 96 being a space defined on an outer side of the cylindrical portion 81 of the second valve seat element 80. The second pressure applying portion 96 is configured to apply a pressure of the fluid to a surface 80a of the second valve seat element 80 opposite to the valve shaft 34. The fluid flowing into the valve seat 8 is a fluid flowing out through the first valve port 9 as well as a fluid flowing out through the second valve port 18. A second pressure applying portion 96 is partitioned under a state in which the second flow passage forming member 25 hermetically seals the second pressure applying portion 98 with respect to the second outflow port 17.

The pressure of the fluid, which is to be applied to the valve shaft 34 arranged inside the valve seat 8, depends on a flow rate of the fluid determined by an opening/closing degree of the valve shaft 34. The fluid flowing into the valve seat 8 also flows (leaks) through the first valve port 9 and the second valve port 18 into a slight gap defined between the valve seat 8 and an outer peripheral surface of the valve shaft 34. Therefore, into the second pressure applying portion 96 adapted for the second valve seat element 80, not only the fluid flowing out through the second valve port 18 flows (leaks), but also the fluid flowing into the slight gap defined between the valve seat 8 and the outer peripheral surface of the valve shaft 34 and flowing out through the first valve port 9 flows. The second valve seat element 80 is made of the same material as that of the first valve seat element 70.

Figure 5B:
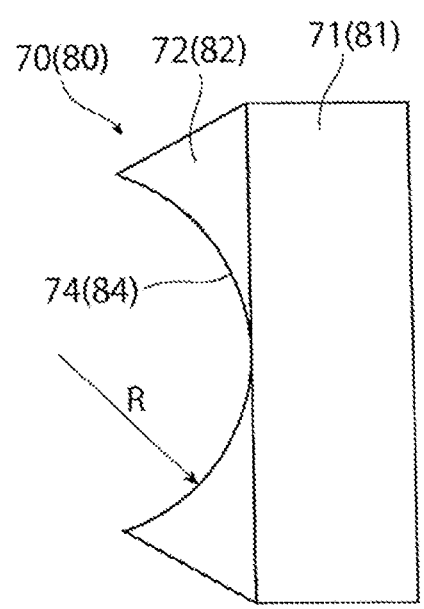
FIG. 5(b) is a plan configuration view for illustrating the valve seat element.
Figure 6:
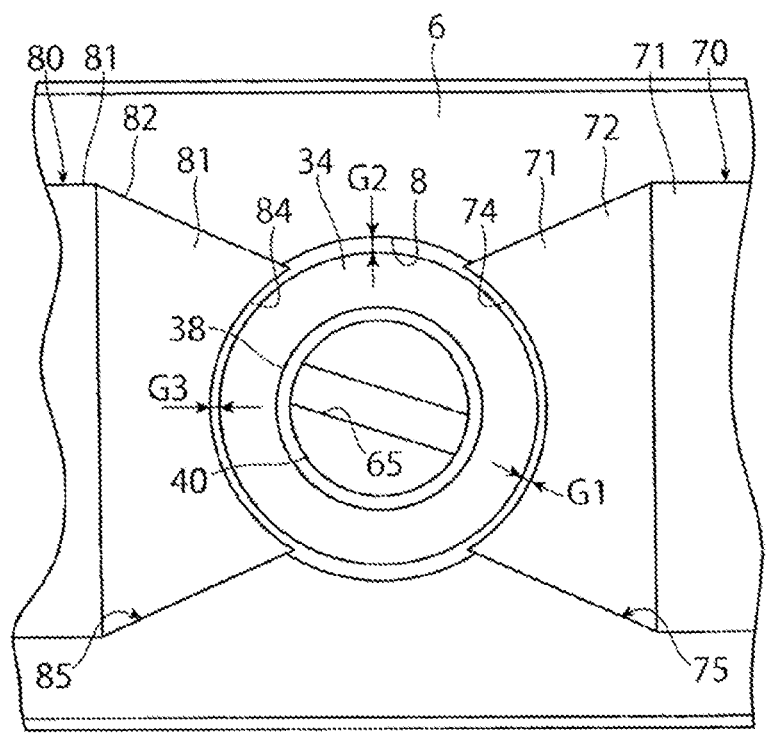
FIG. 6 is a configuration view for illustrating a relationship between the valve seat element and a valve shaft.

As illustrated in FIG. 5(b), a concave portion 84 is formed at a distal end of the tapered portion 82 of the second valve seat element 80. The concave portion 84 is one example of a gap reducing portion having an arc shape in plan view, which forms part of a curved surface of a columnar shape corresponding to the valve seat 8 having a columnar shape in the valve main body 6. A curvature radius R of the concave portion 84 is set to a value substantially equal to a curvature radius of the valve seat 8 or a curvature radius of a valve shaft 34. In order to prevent biting of the valve shaft 34 to be rotated inside the valve seat 8, as described later, the valve seat 8 of the valve main body 6 defines a slight gap with respect to an outer peripheral surface of the valve shaft 34. The concave portion 84 of the second valve seat element 80 is fitted so as to protrude toward the valve shaft 34 side more than the valve seat 8 of the valve main body 6 or so as to be brought into contact with the outer peripheral surface of the valve shaft 34 under a state in which the second valve seat element 80 is fitted to the valve main body 6. As a result, a gap G between the valve shaft 34 and an inner surface of the valve seat 8 of the valve main body 6 being a member opposed to the valve shaft 34 is partially set to a value reduced by the protruding amount of the concave portion 84 of the second valve seat element 80 as compared to that of a gap between the valve shaft 34 and another portion of the valve seat 8. Thus, a gap G3 between the concave portion 84 of the second valve seat element 80 and the valve shaft 34 is set to a desired value (G3<G2) smaller than (or a gap narrower than) the gap G2 between the valve shaft 34 and the inner surface of the valve seat 8. Further, the gap G3 between the concave portion 84 of the second valve seat element 80 and the valve shaft 34 may correspond to a state in which the concave portion 84 of the valve seat element 80 is brought into contact with the valve shaft 34, that is, a state in which no gap is defined (the gap G3=0).

However, in a case in which the concave portion 84 of the second valve seat element 80 is brought into contact with the valve shaft 34, there is a fear in that driving torque of the valve shaft 34 is increased due to contact resistance of the concave portion 84 when the valve shaft 34 is driven to rotate. Accordingly, a contact degree of the concave portion 84 of the second valve seat element 70 with the valve shaft 34 is adjusted in consideration of the rotational torque of the valve shaft 34. That is, the contact degree is adjusted to such an extent as to involve no increase in the driving torque of the valve shaft 34 or involve slight increase even when the driving torque is increased, and cause no trouble for rotation of the valve shaft 34.

As illustrated in FIG. 4, the second flow passage forming member 25 is made of a metal such as SUS or a synthetic resin such as a polyimide (PI) resin and has a cylindrical shape. The second flow passage forming member 25 has the second outflow port 17 formed therein to communicate with the second valve port 18 irrespective of shift of a position of the second valve seat element 80. About one-half of the second flow passage forming member 25 on the second valve seat element 80 side is formed as a small-thickness cylindrical portion 25a having a cylindrical shape with a relatively small thickness. Further, about one-half of the second flow passage forming member 25 on a side opposite to the second valve seat element 80 is formed as a large-thickness cylindrical portion 25b having a cylindrical shape with a thickness larger than the thickness of the portion having the cylindrical shape with a small thickness. An inner surface of the second flow passage forming member 25 extends to form a cylindrical shape. A flange portion 25c having an annular shape is formed at an outer periphery of the second flow passage forming member 25 so as to be located between the small-thickness cylindrical portion 25a and the large-thickness cylindrical portion 25b. The flange portion 25c has a relatively large thickness so as to extend outward in the radial direction. The flange portion 25c is arranged so that its outer peripheral end is in movable contact with an inner peripheral surface of the recess 85.

As illustrated in FIG. 2, a space between the cylindrical portion 81 of the second valve seat element 80 and the small-thickness cylindrical portion 25a of the first flow passage forming member 25 is hermetically sealed (sealed) by a first omniseal 140 corresponding to one example of first sealing means. The first sealing means has a substantially U-shaped cross section and is made of a synthetic resin, and is urged in an opening direction by a spring member made of a metal. As illustrated in FIGS. 5, a stepped portion 83 that receives the first omniseal 140 is formed in an end portion of an inner peripheral surface of the cylindrical portion 81 of the second valve seat element 80 on the outer side of the valve main body 6.

As illustrated in FIGS. 7, the first omniseal 140 has a configuration similar to the configuration of the first omniseal 120. The first omniseal 140 includes a spring member 141 and a sealing member 142. When a pressure of a fluid is not applied or the pressure of the fluid is relatively low, the first omniseal 140 hermetically seals a gap between the second valve seat element 80 and the second flow passage forming member 25 with use of an elastic restoring force of the spring member 141. Meanwhile, when the pressure of the fluid is relatively high, the first omniseal 140 hermetically seals the gap between the second valve seat element 80 and the second flow passage forming member 25 with use of the elastic restoring force of the spring member 141 and the pressure of the fluid. Thus, when the fluid flows into the second pressure applying portion 96 through the gap between the inner peripheral surface of the valve main body 6 and an outer peripheral surface of the second valve seat element 80, the fluid does not flow into the second flow passage forming member 25 through the gap between the second valve seat element 80 and the second flow passage forming member 25, which is sealed by the first omniseal 140.

As illustrated in FIG. 2 and FIG. 3, the end surface 80a of the cylindrical portion 81 of the second valve seat element 80 corresponds to a region (pressure-receiving surface) being subjected to the pressure of the fluid, which is applied by the second pressure applying portion 96.

In the first embodiment of the present invention, the stepped portion 83 into which the first omniseal 140 is to be fitted is formed in the end surface 80a of the cylindrical portion 81 of the second valve seat element 80. Thus, the end surface 80a of the cylindrical portion 81 of the second valve seat element 80 has a structure that is less likely to be subjected to a full pressure of the fluid applied by the second pressure applying portion 96 due to the presence of the stepped portion 83.

Thus, in the first embodiment of the present invention, as illustrated in FIG. 2 and FIG. 3, a first pressure-receiving plate 86 having an annular shape is provided so that the pressure of the fluid is effectively applied by the second pressure applying portion 96 to the end surface 80a of the cylindrical portion 81 of the second valve seat element 80. The first pressure-receiving plate 86 achieves closing by covering the end surface 80a of the cylindrical portion 81 of the second valve seat element 80, which has the stepped portion 83 of the second valve seat element 80. Specifically, the pressure-receiving plate 86 is arranged so as to be in contact with the end surface 80a of the cylindrical portion 81 of the second valve seat element 80 and close the stepped portion 83. The second pressure-receiving plate 86 is made of the same material as that of the second valve seat element 80. Further, a slight gap that allows the fluid to leak into the second pressure applying portion 96 is set between an outer peripheral end surface of the second pressure-receiving plate 86, which extends in the radial direction, and the recess 85 of the valve main body 6.

Meanwhile, a space between an end portion of the large-thickness cylindrical portion 25b, which is another end portion of the second flow passage forming member 25, and the inner peripheral surface of the valve main body 6 is hermetically sealed by a second omniseal 150 corresponding to one example of second sealing means. The second sealing means has a substantially U-shaped cross section and is made of a synthetic resin, and is urged in an opening direction by a spring member made of a metal. As illustrated in FIGS. 5, a cylindrical portion 85c for fitting the second omniseal 150 thereto is formed with a short length on the inner peripheral surface of the valve main body 6. The second omniseal 150 having an outer diameter slightly larger than that of the cylindrical portion 85a of the recess 85 is formed at an outer end portion in an axial direction of the cylindrical portion 85a of the recess 85. The length of the cylindrical portion 85c is set larger than a length of the second omniseal 150.

A gap between the cylindrical portion 85c of the valve main body 6 and the large-thickness cylindrical portion 25b of the second flow passage forming member 25 is hermetically sealed (sealed) by the second omniseal 150. The second omniseal 150 is open toward the second pressure applying portion 96. Specifically, the second omniseal 150 is arranged so that its opening is subjected to the pressure of the fluid, which is applied by the second pressure applying portion 96. The second omniseal 150 has an outer diameter larger than that of the first omniseal 140. However, the second omniseal 150 basically has a configuration similar to the configuration of the first omniseal 140.

A second wave washer (corrugated washer) 26 is provided on the outer side of the cylindrical portion 81 of the second valve seat element 80. The second wave washer 26 is one example of an elastic member configured to push and move the second valve seat element 80 in a direction of coming into contact with the valve shaft 34 while allowing displacement of the second valve seat element 80 in a direction of moving close to and away from the valve shaft 34. As illustrated in FIGS. 10, the second wave washer 26 is made of, for example, stainless steel, iron, or phosphor bronze, and has an annular shape having a desired width when a front side thereof is projected. Further, a side surface of the second wave washer 26 is formed into a wavy (corrugated) shape, and the second wave washer 26 is elastically deformable in a thickness direction thereof. An elastic modulus of the second wave washer 26 is determined by, for example, the thickness, a material, or the number of waves of the second wave washer 26. The second wave washer 26 equivalent to the first wave washer 16 is used.

Moreover, a second adjusting ring 87 is arranged on an outer side of the second wave washer 26. The second adjusting ring 87 is one example of an adjusting member configured to adjust the gap G3 between the valve shaft 34 and the concave portion 84 of the second valve seat element 80 via the second wave washer 26. As illustrated in FIG. 11, the second adjusting ring 87 is made of a synthetic resin having heat resistance or metal, and is formed of a cylindrical member having a relatively small length and a male thread 87a formed in an outer peripheral surface thereof. Recessed grooves 87b are formed in an outer end surface of the second adjusting ring 87 so as to be 180 degrees opposed to each other. When the second adjusting ring 87 is fastened and fitted into a female thread portion 88 formed in the valve main body 6, a jig (not shown) for adjusting a fastening amount is locked to the recessed grooves 87b so as to turn the second adjusting ring 87.

As illustrated in FIG. 3, the second female thread portion 88 for fitting the second adjusting ring 87 is formed in the valve main body 6. A cylindrical portion 89 having a short length is formed at an opening end portion of the valve main body 6, and has an outer diameter substantially equal to an outer diameter of the second adjusting ring 87. Further, a cylindrical portion 85d for processing having an inner diameter larger than that of the second female thread portion 88 is formed with a short length between the second female thread portion 88 of the valve main body 6 and the cylindrical portion 85c so as to enable processing for forming the second female thread portion 88 over a required length.

The second adjusting ring 87 is configured to adjust an amount (distance) of pushing and moving the second valve seat element 80 inward by the second adjusting ring 87 via the second wave washer 26 through adjustment of a fastening amount of the second adjusting ring 87 with respect to the female thread portion 88 of the valve main body 6. When the fastening amount of the second adjusting ring 87 is increased, as illustrated in FIG. 6, the second valve seat element 80 is pushed by the second adjusting ring 87 via the second wave washer 26 so that the concave portion 84 protrudes from an inner peripheral surface of the valve seat 8 and is displaced in a direction of approaching the valve shaft 34. Thus, the gap G3 between the concave portion 84 and the valve shaft 34 is reduced. Further, when the fastening amount of the second adjusting ring 87 is set to a small amount in advance, the distance of pushing and moving the second valve seat element 80 by the second adjusting ring 87 is reduced. As a result, the second valve seat element 80 is arranged apart from the valve shaft 34, and the gap G3 between the concave portion 84 of the second valve seat element 80 and the valve shaft 34 is relatively increased. The male thread 87a of the second adjusting ring 87 and the female thread portion 88 of the valve main body 6 are each set to have a small pitch. With this configuration, a protruding amount of the second valve seat element 80 can be finely adjusted.

As illustrated in FIG. 2, a second flange member 19 as an example of a connecting member for connecting a pipe (not shown) which allows outflow of the fluid is mounted to the another side surface of the valve main body 6 with four hexagon socket head cap screws 20. Similarly to the first flange member 10, the second flange member 19 is made of metal, for example, SUS. The second flange member 19 has a flange portion 21, an insertion portion 22, and a pipe connecting portion 23. The flange portion 21 has a side surface having the same rectangular shape as the side surface of the valve main body 6. The insertion portion 22 has a cylindrical shape and protrudes from an inner surface of the flange portion 21. The pipe connecting portion 23 has a substantially cylindrical shape having a large thickness and protrudes from an outer surface of the flange portion 21. A pipe (not shown) is connected to the pipe connecting portion 23. As illustrated in FIG. 2, a space between the flange portion 21 of the second flange member 19 and the valve main body 6 is hermetically sealed by an O-seal 21a. An annular recessed groove 21b configured to receive the O-seal 21a is formed in an inner peripheral surface of the flange portion 21 of the second flange member 19. An inner periphery of the pipe connecting portion 23 is set to, for example, Rc 1/2 being a standard for a tapered female thread having a bore diameter of about 21 mm, or a female thread having a diameter of about 0.58 inches. Similarly to the pipe connecting portion 14, the shape of the pipe connecting portion 23 is not limited to the tapered female thread or the female thread. The pipe connecting portion 23 may have, for example, a tube fitting shape that allows a tube to be fitted thereto. The pipe connecting portion 23 may have any shape as long as the pipe connecting portion 23 enables inflow of a fluid through the second outflow port 17.

As the fluid (brine), for example, a fluorine-based inert liquid adaptable at a pressure of from 0 MPa to 1 MPa and within a temperature range of from about −85° C. to about 120° C., for example, Opteon (trademark) (manufactured by Chemours-Mitsui Fluoroproducts Co., Ltd.) or Novec (trademark) (manufactured by 3M company) is used.

Further, as illustrated in FIG. 2, in a lower end surface of the valve main body 6, an inflow port 26 having a circular cross section as the third valve port is opened. The inflow port 26 allows inflow of a fluid. A third flange member 27 as an example of a connecting member for connecting a pipe (not shown) which allows inflow of the fluid is mounted to the lower end surface of the valve main body 6 with four hexagon socket head cap screws 28. A cylindrical portion 26a that has an inner diameter larger than the inflow port 26 so as to allow the third flange member 27 to be fitted therein is opened in a lower end portion of the inflow port 26. The third flange portion 27 has a flange portion 29, an insertion portion 30 (see FIG. 2), and a pipe connecting portion 31. The flange portion 29 has a bottom surface having a rectangular shape. The insertion portion 30 has a cylindrical shape with a short length and protrudes from an inner surface of the flange portion 29. The pipe connecting portion 31 has a substantially cylindrical shape having a large thickness and protrudes from an outer surface of the flange portion 29. A pipe (not shown) is connected to the pipe connecting portion 31. As illustrated in FIG. 2, a space between the flange portion 29 of the third flange member 27 and the valve main body 6 is hermetically sealed by an O-seal 29a. A recessed groove 29b for receiving the O-seal 29a is formed in an inner peripheral surface of the flange portion 29 of the third flange member 27. An inner periphery of the pipe connecting portion 31 is set to, for example, Rc 1/2 being a standard for a tapered female thread having a bore diameter of about 21 mm and a female thread having a diameter of about 0.58 inches. The shape of the pipe connecting portion 31 is not limited to the tapered female thread or the female thread. The pipe connecting portion 31 may have, for example, a tube fitting shape that allows a tube to be fitted thereto. The pipe connecting portion 31 may have any shape as long as the pipe connecting portion 31 enables inflow of a fluid through the inflow port 26.

Figure 12A:
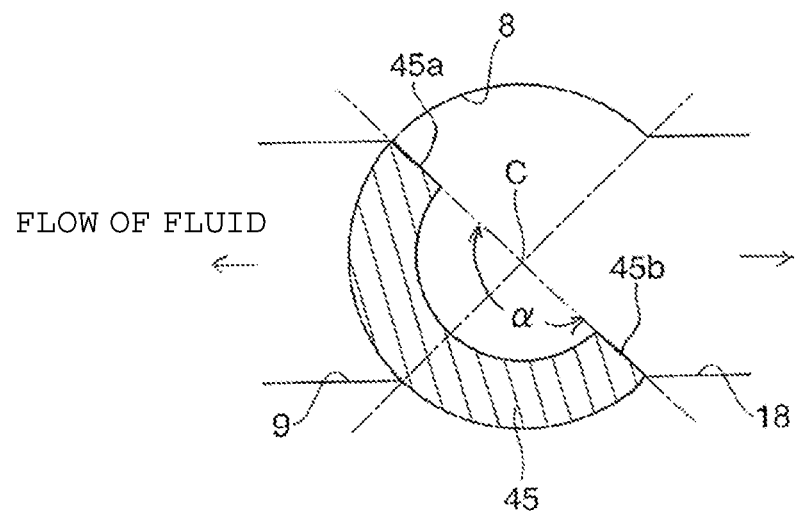
FIG. 12(a) is a configuration view of a state in which one of valve ports is completely opened, for illustrating an operation of the valve shaft.
Figure 12B:
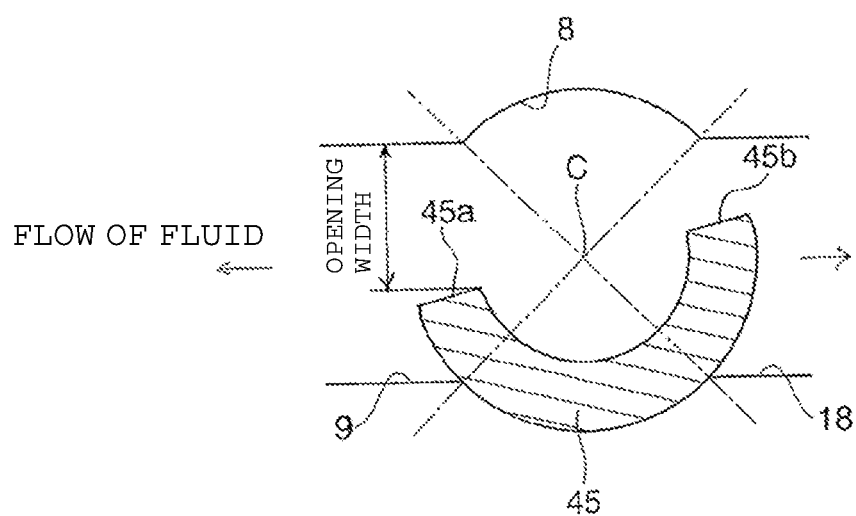
FIG. 12(b) is a configuration view of a state in which both of the valve ports are partially opened, for illustrating the operation of the valve shaft.

As illustrated in FIG. 3, the valve seat 8 is formed in a center of the valve main body 6. The valve seat 8 forms the first valve port 9 having a rectangular cross section and the second valve port 18 having a rectangular cross section when the first valve seat element 70 and the second valve seat element 80 are fitted to the valve main body 6. The valve seat 8 has a space having a columnar shape corresponding to an outer shape of a valve body to be described later. Further, part of the valve seat 8 is formed by the first valve seat element 70 and the second valve seat element 80. The valve seat 8 having a columnar shape is provided in a state of penetrating an upper end surface of the valve main body 6. As illustrated in FIGS. 12, the first valve port 9 and the second valve port 18 provided to the valve main body 6 are arranged in an axial symmetrical manner with respect to a center axis (rotation axis) C of the valve seat 8 having a columnar shape. More specifically, the first valve port 9 and the second valve port 18 are arranged so as to be orthogonal to the valve seat 8 having a columnar shape. One end edge of the first valve port 9 is opened in a position opposed to another end edge of the second valve port 18 through the center axis C, that is, in a position different by 180°. Further, another end edge of the first valve port 9 is opened in a position opposed to one end edge of the second valve port 18 through the center axis C, that is, in a position different by 180°. In FIGS. 12, for convenience, illustration of a gap between the valve seat 8 and the valve shaft 34 is omitted.

Further, as illustrated in FIG. 2, the first valve port 9 and the second valve port 18 are openings each having a rectangular cross section such as a square cross section and are formed through fitting through fitting of the first valve seat element 70 and the second valve seat element 80 to the valve main body 6 as described above. A length of one side of the first valve port 9 and the second valve port 18 is set to be smaller than a diameter of the first outflow port 7 and the second outflow port 17. The first valve port 9 and the second valve port 18 are formed in a polygonal cylinder shape having a cross section having a rectangular shape inscribed in the first outflow port 7 and the second outflow port 17.

Figure 13A:
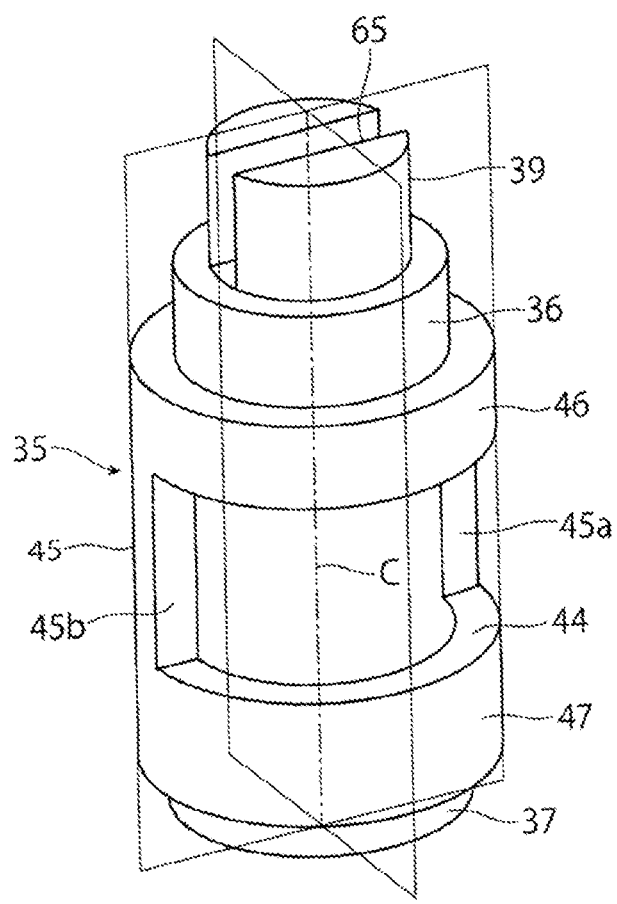
FIG. 13(a) is a perspective configuration view for illustrating the valve shaft.
Figure 13B:
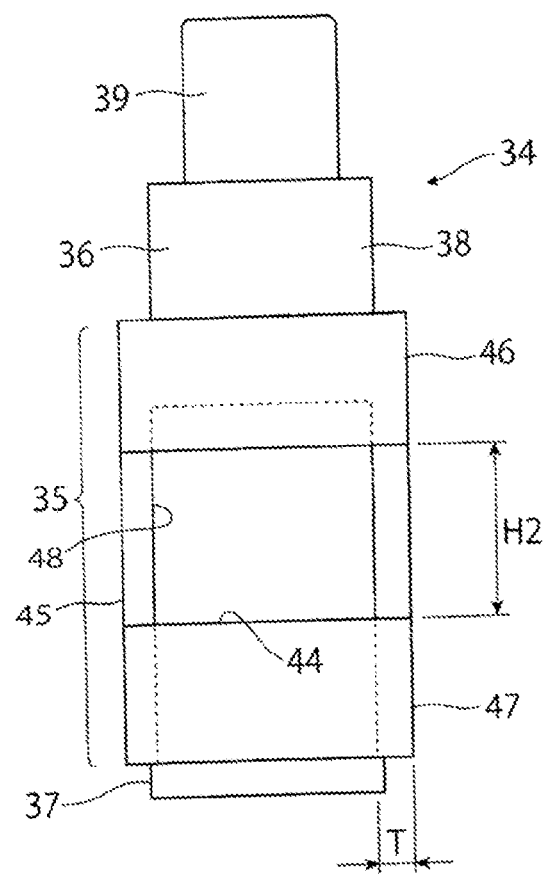
FIG. 13(b) is a front configuration view for illustrating the valve shaft.

As illustrated in FIGS. 13, a valve shaft 34 as one example of the valve body has an outer shape obtained by forming metal, for example, SUS, into a substantially columnar shape. The valve shaft 34 mainly includes a valve body portion 35, upper and lower shaft support parts 36 and 37, a sealing portion 38, and a coupling portion 39, which are integrally provided. The valve body portion 35 functions as a valve body. The upper and lower shaft support parts 36 and 37 are provided above and below the valve body portion 35, respectively, and support the valve shaft 34 in a freely rotatable manner. The sealing portion 38 is formed of the same part of the upper shaft support part 36. The coupling portion 39 is provided to an upper portion of the sealing portion 38.

The upper and lower shaft support parts 36 and 37 each have a cylindrical shape having an outer diameter smaller than that of the valve body portion 35 and having an equal or a different diameter. As illustrated in FIG. 4, the lower shaft support part 37 is rotatably supported by a lower end portion of the valve seat 8 provided to the valve main body 6 through intermediation of a bearing 41 serving as a bearing member. A support portion 42 having an annular shape for supporting the bearing 41 is provided at a lower portion of the valve seat 8. The bearing 41, the support portion 42, and the inflow port 26 are set to have a substantially equal inner diameter, and are configured to allow inflow of the fluid for temperature control to an inside of the valve body portion 35 with little resistance.

Further, as illustrated in FIG. 2 and FIG. 13(*b*), the valve body portion 35 has a cylindrical shape having an opening 44 formed therein. The opening 44 has a substantially half-cylindrical shape with an opening height H2, which is smaller than an opening height H1 of the first and second valve ports 9 and 18. A valve operating portion 45 having the opening 44 of the valve body portion 35 has a half-cylindrical shape (substantially half-cylindrical shape of a cylindrical portion excluding the opening 44) with a predetermined central angle α (for example, 180°). The valve operating portion 45 is arranged in a freely rotatable manner in the valve seat 8 and held in non-contact with an inner peripheral surface of the valve seat 8 through a slight gap to prevent metal-to-metal biting. Accordingly, with the valve body portion 35 positioned above and below the opening 44 included, the valve operating portion 45 simultaneously switches the first valve port 9 from a closed state to an opened state and the second valve port 18 from an opened state to a closed state in a reverse direction. As illustrated in FIGS. 13, upper and lower valve shaft parts 46 and 47 arranged above and below the valve operating portion 45 each have a cylindrical shape having an outer diameter equal to that of the valve operating portion 45, and are held in non-contact with the inner peripheral surface of the valve seat 8 in a freely rotatable manner through a slight gap. In an inside over the valve operating portion 45 and the upper and lower valve shaft parts 46 and 47, a space 48 is provided in a state of penetrating the valve shaft 34 toward a lower edge thereof. The space 48 has a columnar shape.

Further, a cross section of each of both end surfaces 45*a* and 45*b* of the valve operating portion 45 in a circumferential direction (rotation direction), which is taken along a direction intersecting (orthogonal to) the center axis C, has a planar shape. More specifically, as illustrated in FIGS. 13, the cross section of each of the both end portions 45*a* and 45*b* of the valve operating portion 45 in the circumferential direction, which is taken along a direction intersecting a rotation axis C, has a planar shape toward the opening 44. A thickness of each of both end portions 45*a* and 45*b* is set to, for example, a value equal to a thickness T of the valve operating portion 45.

The cross section of each of the both end portions 45*a* and 45*b* of the valve operating portion 45 in the circumferential direction, which is taken along a direction intersecting the rotation axis C, is not limited to a planar shape. Each of the both end surfaces 45*a* and 45*b* in the circumferential direction (rotation direction) may have a curved-surface shape.

Figure 14A:
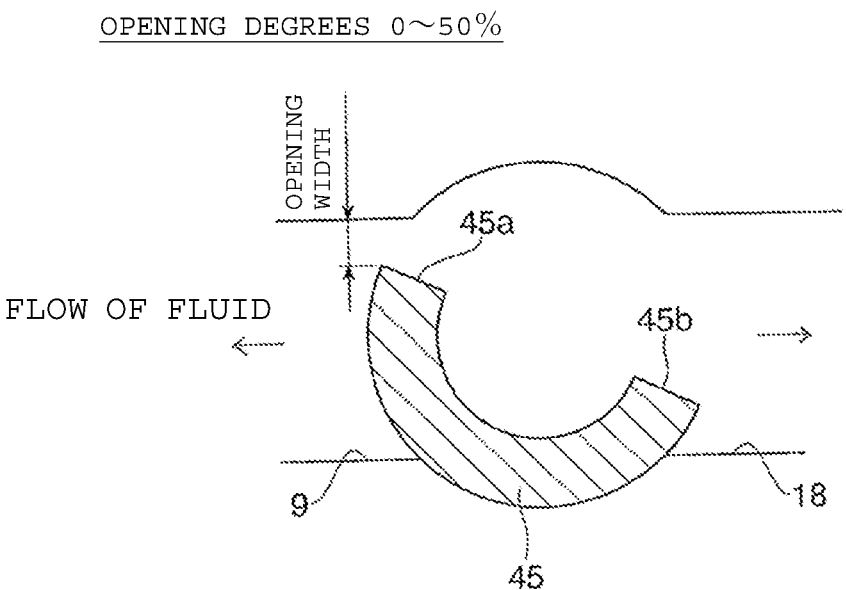
FIG. 14(a) is a configuration view for illustrating the operation of the valve shaft.
Figure 14B:
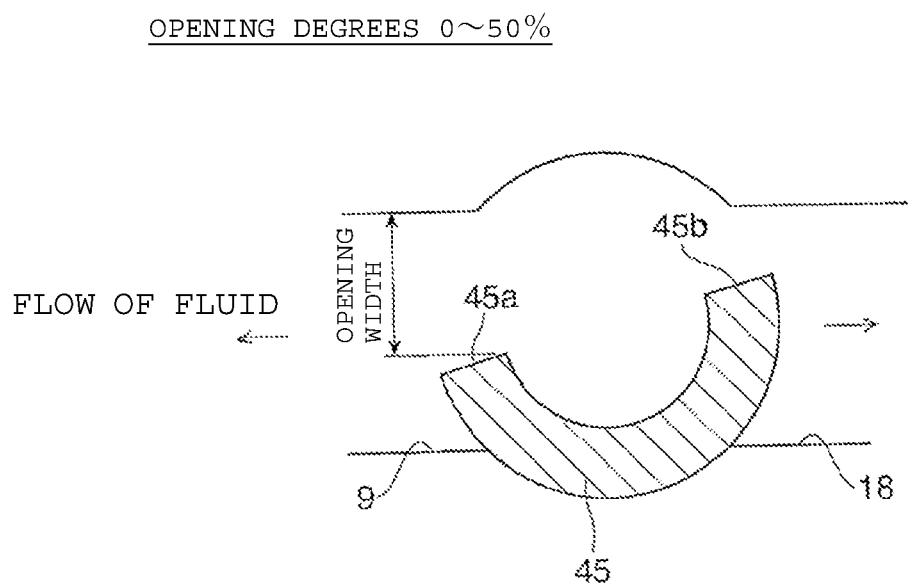
FIG. 14(b) is a configuration view for illustrating the operation of the valve shaft.

As illustrated in FIGS. 14, when the valve shaft 34 is driven to rotate to open and close the first and second valve ports 9 and 18, in flows of the fluid, the both end portions 45*a* and 45*b* of the valve operating portion 45 in the circumferential direction are moved (rotated) so as to protrude from or retreat to the ends of the first and second valve ports 9 and 18 in the circumferential direction. Accordingly, the first and second valve ports 9 and 18 are switched from the opened state to the closed state, or from the closed state to the opened state. At this moment, it is desired that each of the both end portions 45*a* and 45*b* of the valve operating portion 45 in the circumferential direction have a cross section having a planar shape so as to linearly change opening areas of the first and second valve ports 9 and 18 with respect to a rotation angle of the valve shaft 34.

As illustrated in FIG. 2, the sealing portion 4 hermetically seals (seals) the valve shaft 34 in a liquid-tight state so that the valve shaft 34 is rotatable with respect to the valve main body 6. The sealing portion 4 includes the valve main body 6, the valve shaft 34, omniseals 160 and 170, and a bearing member 180. The omniseals 160 and 170 are one example of sealing means and are arranged between the valve main body 6 and the valve shaft 34 so as to seal a space therebetween in a liquid-tight state. The omniseals 160 and 170 each have a substantially U-shaped cross section and are made of a synthetic resin, and are each urged in an opening direction by a spring member made of metal. The bearing member 180 supports the valve shaft 34 so that the valve shaft 34 is rotatable with respect to the valve main body.

As illustrated in FIG. 2, a supporting recessed portion 51 having a columnar shape for rotatably supporting the valve shaft 34 is formed in an upper end portion of the valve main body 6. A cylindrical portion 51b having a larger inner diameter is formed at an upper end of the supporting recessed portion 51 with a tapered portion 51a being arranged therebetween. As described above, the upper valve shaft portion 46 of the valve shaft 34 is supported at a lower end portion of the supporting recessed portion 51 through intermediation of the bearing 180 corresponding to one example of a bearing member and the omniseals 160 and 170 so as to be rotatable and in a liquid-tight state.

As illustrated in FIGS. 1, the coupling portion 5 is arranged between the valve main body 6, in which the sealing portion 4 is provided, and the actuator portion 3. The coupling portion 5 is configured to connect the valve shaft 34 and a rotation shaft (not shown), which allows the valve shaft 34 to be integrally rotated, to each other.

As illustrated in FIG. 2, the coupling portion 5 includes a spacer member 59, an adaptor plate 60, and a coupling member 62. The spacer member 59 is arranged between the sealing portion 4 and the actuator portion 3. The adaptor plate 60 is fixed to an upper portion of the spacer member 59. The coupling member 62 is accommodated in a space 61 having a columnar shape formed in a state of penetrating an inside of the spacer member 59 and the adaptor plate 60, and connects the valve shaft 34 and the rotation shaft (not shown) to each other. The spacer member 59 is obtained by forming a synthetic resin such as a polyimide (PI) resin, into a parallelepiped shape, which has substantially the same planar shape as that of the valve main body 6 and a relatively large height. The spacer member 59 is fixed to both the valve main body 6 and the adaptor plate 60 through means such as screw fastening 59b of a flange portion 59a provided to the lower end of the spacer member 59. Further, as illustrated in FIG. 2(c), the adaptor plate 60 is obtained by forming metal, for example, SUS, into a plate-like shape having a planar polygonal shape. The adaptor plate 60 is mounted to a base 64 of the actuator portion 3 in a fixed state with hexagon socket head cap screws 63.

As illustrated in FIG. 13(a), a recessed groove 65 is formed so as to penetrate an upper end of the valve shaft 34 in a horizontal direction. The valve shaft 34 is coupled and fixed to the coupling member 62 by fitting a projecting portion 66 of the coupling member 62 into the recessed groove 65. Meanwhile, a recessed groove 67 is formed in an upper end of the coupling member 62 so as to penetrate the coupling member 62 in a horizontal direction. The rotation shaft (not shown) is coupled and fixed to the coupling member 62 by fitting a projecting portion (not shown) into the recessed groove 67 of the coupling member 62. An O-seal 190 for preventing a liquid from reaching the actuator portion 3 when the liquid leaks from the sealing portion 4 is provided at an upper end portion of the spacer member 59.

As illustrated in FIGS. 1, the actuator portion 3 includes the base 64 having a rectangular shape in plan view. A casing 90 is mounted to an upper portion of the base 64 with screws 91. The casing 90 is constructed as a box body having a rectangular parallelepiped shape, which contains drive means including a stepping motor, an encoder, and the like. The drive means in the actuator portion 3 only needs to be capable of rotating the rotation shaft (not shown) in a desired direction with predetermined accuracy based on control signals, and configuration thereof is not limited. The drive means includes a stepping motor, a driving force transmission mechanism, and an angle sensor. The driving force transmission mechanism is configured to transmit a rotational driving force of the stepping motor to the rotation shaft through intermediation of driving force transmission means, for example, a gear. The angle sensor is, for example, an encoder or the like configured to detect a rotation angle of the rotation shaft.

In FIGS. 1, a reference symbol 92 denotes a stepping motor-side cable, and a reference symbol 93 denotes an angle sensor-side cable. The stepping motor-side cable 92 and the angle sensor-side cable 93 are connected to a control device (not shown) configured to control the three-way motor valve 1.

<Environmental Conditions>

As described above, the three-way motor valve 1 according to the first embodiment of the present invention is configured so as to be usable for a fluid having a significantly low temperature of, for example, from about −85° C. to about 120° C., in particular, about −85° C. Thus, it is desirable that ambient environmental conditions under which the three-way motor valve 1 is to be used be set in accordance with a temperature range of from about −85° C. to about 120° C. Specifically, when a fluid having a temperature of about −85° C. is allowed to flow through the three-way motor valve 1, a temperature of the valve main body 6 itself becomes equal to about −85° C., which is the temperature of the fluid. As a result, when conditions for an environment under which the three-way motor valve 1 is used include a humidity being moisture in air, it is considered that moisture in air, which adheres to the three-way motor valve 1 and freezes, may cause malfunction of the three-way motor valve 1.

Thus, in the first embodiment of the present invention, it is desirable that an ambient humidity (relative humidity) be 0.10% or less, preferably about 0.01% under an environment replaced by a nitrogen ($N^{2-}$) gas as environmental conditions under which the three-way motor valve 1 is used.

<Operation of Three-Way Motor Valve>

When a fluid having a low temperature of about −85° C. is allowed to flow through the three-way motor valve 1 according to the first embodiment of the present invention, the flow rate of the fluid is controlled as follows.

As illustrated in FIG. 4, at the time of assembly or adjustment for use, in the three-way motor valve 1, the first flange member 10 and the second flange member 19 are once removed from the valve main body 6 so that the adjusting rings 77 and 87 are exposed to the outside. Under this state, when the fastening amounts of the adjusting rings 77 and 87 with respect to the valve main body 6 are adjusted through use of the jig (not shown), as illustrated in FIG. 6, the protruding amounts of the first valve seat element 70 and the second valve seat element 80 from the valve seat 8 of the valve main body 6 are changed. When the fastening amounts of the adjusting rings 77 and 87 with respect to the valve main body 6 are increased, the concave portions 74 of the first valve seat element 70 or the concave portion 84 of the second valve seat element 80 protrudes from the inner peripheral surface of the valve seat 8 of the valve main body 6 so that the gap G1 between the outer peripheral surface of the valve shaft 34 and the concave portion 74 of the first valve seat element 70 or the concave portion 84 of the second valve seat element 80 is reduced. Accordingly, the outer peripheral surface of the valve shaft 34 is brought into contact with the concave portion 74 of the first valve seat element 70 or the concave portion 84 of the second valve seat element 80. Meanwhile, when the fastening amounts of the adjusting rings 77 and 87 with respect to the valve main body 6 are reduced, a protruding length of the concave portion 74 of the first valve seat element 70 or the concave portion 84 of the second valve seat element 80 from the inner peripheral surface of the valve seat 8 of the valve main body 6 is reduced so that the gap G1 between the outer peripheral surface of the valve shaft 34 and the concave portion 74 of the first valve seat element 70 or the concave portion 84 of the second valve seat element 80 is increased.

In the first embodiment of the present invention, for example, the gap G1 between the outer peripheral surface of the valve shaft 34 and the concave portion 74 of the first valve seat element 70 or the concave portion 84 of the second valve seat element 80 is set to be smaller than 10 µm. However, the gap G1 between the outer peripheral surface of the valve shaft 34 and the concave portion 74 of the first valve seat element 70 or the concave portion 84 of the second valve seat element 80 is not limited to the above-mentioned value. The gap G1 may be set to a value smaller than the above-mentioned value, for example, may satisfy the gap G1=0 µm (contact state). Alternatively, the gap G1 may be set to 10 µm or more.

As illustrated in FIG. 2, the fluid flows into the three-way motor valve 1 from the third flange member 27 via a pipe (not shown), and the fluid flows out from the first flange member 10 and the second flange member 19 via pipes (not shown). Further, as illustrated in FIG. 14(a), for example, in an initial state before start of operation, the three-way motor valve 1 is brought into a state in which the valve operating portion 45 of the valve shaft 34 simultaneously closes (completely closes) the first valve port 9 and opens (completely opens) the second valve port 18.

As illustrated in FIG. 2, in the three-way motor valve 1, when the stepping motor (not shown) provided in the actuator portion 3 is driven to rotate by a predetermined amount, the rotation shaft (not shown) is driven to rotate in accordance with a rotation amount of the stepping motor. In the three-way motor valve 1, when the rotation shaft is driven to rotate, the valve shaft 34 coupled and fixed to the rotation shaft is rotated by an angle equivalent to the rotation amount (rotation angle) of the rotation shaft. The valve operating portion 45 is rotated in the valve seat 8 along with the rotation of the valve shaft 34. With this, as illustrated in FIG. 12(a), the one end portion of the valve operating portion 45 in the circumferential direction gradually opens the first valve port 9. As a result, the fluid flowing in from the inflow port 26 flows into the valve seat 8 and flows out from a first housing member 10 through the first outflow port 7.

At this time, as illustrated in FIG. 14(a), another end portion 45b of the valve operating portion 45 in the circumferential direction opens the second valve port 18. Thus, the fluid having flowed into the valve seat 8 through the inflow port 27 is divided in accordance with a rotation amount of the valve shaft 34, and flows out from a second housing member 19 through the second outflow port 17.

As illustrated in FIG. 14(a), in the three-way motor valve 1, when the valve shaft 34 is driven to rotate, and one end portion 45a of the valve operating portion 45 in the circumferential direction gradually opens the first valve port 9, the fluid flows through the valve seat 8 and the valve shaft 34, and is supplied to the outside through the first valve port 9 and the second valve port 18 and through the first outflow port 9 and the second outflow port 18.

Further, in the three-way motor valve 1, each of the both end portions 45a and 45b of the valve operating portion 45 in the circumferential direction has a cross section having a curved-surface shape or a planar shape. Thus, the opening areas of the first and second valve ports 9 and 18 can be linearly changed with respect to the rotation angle of the valve shaft 34. Further, it is conceivable that the fluid regulated in flow rate by the both end portions 45a and 45b of the valve operating portion 45 flow in a form of a nearly laminar flow. Therefore, the distribution ratio (flow rate) between the fluid can be controlled with high accuracy in accordance with the opening areas of the first valve port 9 and the second valve port 18.

In the three-way motor valve 1 according to the first embodiment of the present invention, as described above, under an initial state, the valve operating portion 45 of the valve shaft 34 simultaneously closes (completely closes) the first valve port 9 and opens (completely opens) the second valve port 18.

At this time, in the three-way motor valve 1, when the valve operating portion 45 of the valve shaft 34 closes (completely closes) the first valve port 9, ideally, the flow rate of the fluid should be zero.

However, as illustrated in FIG. 6, in the three-way motor valve 1, in order to prevent metal-to-metal biting of the valve shaft 34 into the inner peripheral surface of the valve seat 8, the valve shaft 34 is provided in a freely rotatable manner so as to be held in non-contact with the valve seat 8 with a slight gap between the outer peripheral surface of the valve shaft 34 and the inner peripheral surface of the valve seat 8. As a result, the slight gap G2 is defined between the outer peripheral surface of the valve shaft 34 and the inner peripheral surface of the valve seat 8. Accordingly, in the three-way motor valve 1, even when the valve operating portion 45 of the valve shaft 34 closes (completely closes) the first valve port 9, the flow rate of the fluid does not become zero, and a small amount of the fluid flows to the second valve port 18 side through the slight gap G2 defined between the outer peripheral surface of the valve shaft 34 and the inner peripheral surface of the valve seat 8.

Incidentally, in the three-way motor valve 1 according to the first embodiment of the present invention, as illustrated in FIG. 6, the first valve seat element 70 and the second valve seat element 80 include the concave portion 74 and the concave portion 84, respectively. The concave portion 74 or the concave portion 84 protrudes from the inner peripheral surface of the valve seat 8 toward the valve shaft 34 side, thereby partially reducing the gap G1 between the outer peripheral surface of the valve shaft 34 and the inner peripheral surface of the valve seat 8.

Therefore, in the three-way motor valve 1, in order to prevent metal-to-metal biting of the valve shaft 34 into the inner peripheral surface of the valve seat 8, even when the valve shaft 34 is provided in a freely rotatable manner so as to be held in non-contact with the valve seat 8 with the slight gap between the outer peripheral surface of the valve shaft 34 and the inner peripheral surface of the valve seat 8, inflow of the fluid through the first valve port 9 into the slight gap G2 defined between the outer peripheral surface of the valve shaft 34 and the inner peripheral surface of the valve seat 8 is significantly restricted and suppressed by the gap G1 that is a region corresponding to a partially reduced gap between the outer peripheral surface of the valve shaft 34 and the inner peripheral surface of the valve seat 8.

Accordingly, the three-way motor valve 1 can significantly suppress leakage of the fluid when the three-way motor valve 1 completely closes the valve port as compared to a three-way motor valve that does not include the concave portions 74 and 84 formed to partially reduce the gap between the valve shaft 34 and the first valve seat element 70, which is opposed to the valve shaft 34, and the gap between the valve shaft 34 and the second valve seat element 80, which is opposed to the valve shaft 34.

Preferably, the three-way motor valve 1 according to the first embodiment of the present invention can significantly reduce the gaps G1 and G2 through contact of the concave portion 74 of the first valve seat element 70 and the concave portion 84 of the second valve seat element 80 with the outer peripheral surface of the valve shaft 34, thereby significantly suppressing leakage of the fluid when the three-way motor valve 1 completely closes the valve port.

Further, similarly, the three-way motor valve 1 can significantly suppress leakage and outflow of the fluid through the second valve port 18 to another first valve port 9 side even when the valve operating portion 45 of the valve shaft 34 closes (completely closes) the second valve port 18.

Moreover, as illustrated in FIG. 3, in the first embodiment of the present invention, the first pressure applying portion 94 and the second pressure applying portion 96 are respectively provided to the surface 70a of the first valve seat element 70 and the surface 80a of the second valve seat element 80 that are opposite to the valve shaft 34. The first pressure applying portion 94 and the second pressure applying portion 96 are configured to apply the pressure of the fluid through the slight gap between the outer peripheral surface of the valve shaft 34 and the inner peripheral surface of the valve seat 8. Accordingly, as illustrated in FIG. 12(a), in the three-way motor valve 1, under a state in which an opening degree is 0%, that is, the first valve port 9 is nearly completely closed, and under a state in which the opening degree is 100%, that is, the first valve port 9 is nearly completely opened, when the first valve port 9 and the second valve port 18 are each brought closer to a completely closed state, an amount of outflow of the fluid through the first valve port 9 and the second valve port 18 is significantly reduced. Along with this, in the three-way motor valve 1, in the valve port brought closer to a completely closed state, the pressure of the fluid flowing out through the first valve port 9 or the second valve port 18 is reduced. Thus, for example, when the opening degree is 0%, that is, the first valve port 9 is completely closed, the fluid having a pressure of about 700 KPa flows in through the inflow port 26, and then flows out through the second valve port 18 while maintaining the pressure of about 700 KPa. At this time, on the side of the first valve port 9 that is nearly completely closed, a pressure on an outflow side is reduced to, for example, about 100 KPa. As a result, there is a difference in pressure of about 600 KPa between the second valve port 18 and the first valve port 9.

Therefore, in the three-way motor valve 1 against which no countermeasures are taken, due to the difference in pressure between the second valve port 18 and the first valve port 9, the valve shaft 34 is moved (displaced) to the side of the first valve port 9 under a relatively low pressure so that the valve shaft 34 is held in unbalanced contact with the bearing 41. As a result, there is a fear in that driving torque is increased when the valve shaft 34 is driven to rotate in a direction of closing the valve shaft 34, thereby causing operation malfunction.

Figure 15:
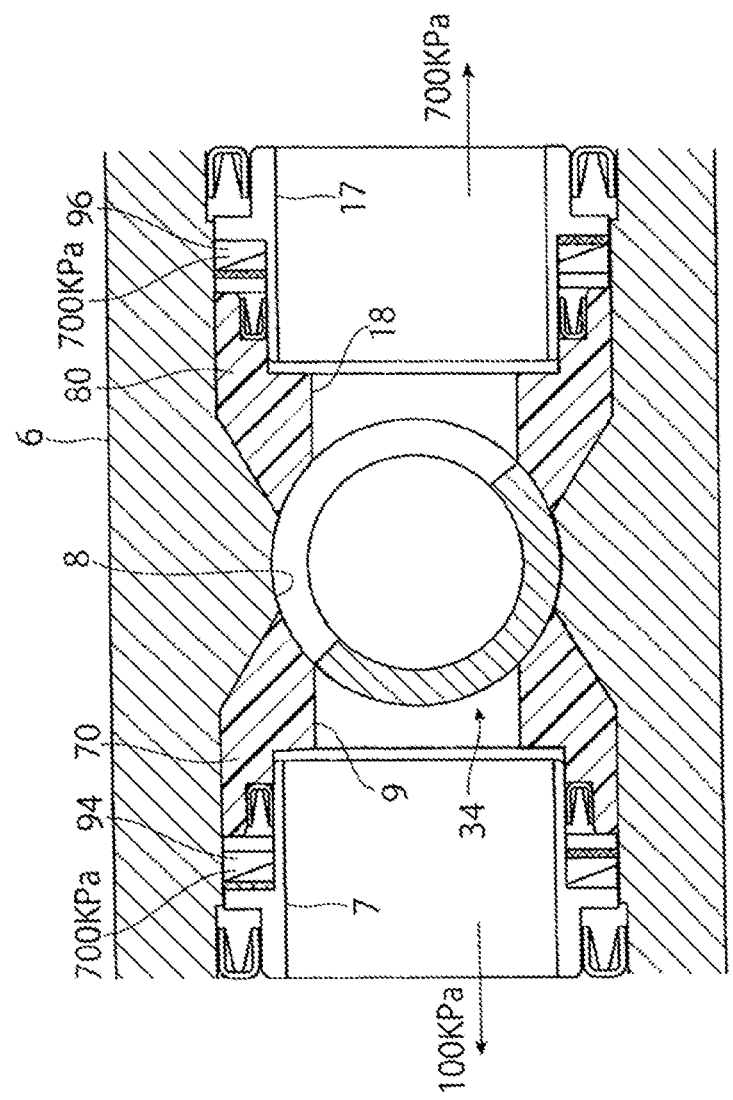
FIG. 15 is a sectional configuration view for illustrating an operation of the three-way motor valve as one example of the three-way valve for flow rate control according to the first embodiment of the present invention.

In contrast, in the three-way motor valve 1 according to the first embodiment of the present invention, as illustrated in FIG. 15, the first pressure applying portion 94 and the second pressure applying portion 96 are respectively provided to the surface of the first valve seat element 70 and the surface of the second valve seat element 80 that are opposite to the valve shaft 34. The first pressure applying portion 94 and the second pressure applying portion 96 are configured to apply, to the first valve seat element 70 and the second valve seat element 80, the pressure of the fluid leaking through the slight gap between the outer peripheral surface of the valve shaft 34 and the inner peripheral surface of the valve seat 8. Thus, in the three-way motor valve 1 according to the first embodiment of the present invention, even when there is a difference in pressure between the second valve port 18 and the first valve port 9, a relatively high pressure of the fluid is applied to the first pressure applying portion 94 and the second pressure applying portion 96 through the slight gap between the outer peripheral surface of the valve shaft 34 and the inner peripheral surface of the valve seat 8. As a result, owing to the relatively high pressure of the fluid of about 100 KPa, which is applied to the first pressure applying portion 94, the first valve seat element 70 under a relatively low pressure of about 100 KPa is operated so as to restore the valve shaft 34 to a proper position. Therefore, the three-way motor valve 1 according to the first embodiment of the present invention can prevent and suppress the valve shaft 34 from being moved (displaced) to the side of the first valve port 9 under a relatively low pressure due to the difference in pressure between the second valve port 18 and the first valve port 9, can keep a state in which the valve shaft 34 is smoothly supported by the bearing 41, and can prevent and suppress an increase in driving torque when the valve shaft 34 is driven to rotate in the direction of closing the valve shaft 34.

Further, the three-way motor valve 1 according to the first embodiment of the present invention similarly operates also under a state in which the first valve port 9 is nearly completely opened, that is, the second valve port 18 is nearly completely closed, and thus can prevent and suppress the increase in driving torque when the valve shaft 34 is driven to rotate.

In the three-way motor valve 1 according to the first embodiment of the present invention, as the fluid (brine), for example, a fluorine-based inert liquid adaptable at a pressure of from 0 MPa to 1 MPa and within a temperature range of from about $-85°$ C. to about $120°$ C., for example, Opteon (trademark) (manufactured by Chemours-Mitsui Fluoroproducts Co., Ltd.) or Novec (trademark) (manufactured by 3M company) is used.

When the three-way motor valve 1 switches an outflow amount of the fluid having a temperature of about $-85°$ C., a temperature of the valve main body 6 itself through which the fluid flows becomes equal to about $-85°$ C.

In the three-way motor valve 1, the first and second omniseals 120, 130, 140, and 150 are used to hermetically seal (seal) the spaces between the first and second valve seat elements 70 and 80 and the first and second flow passage forming members 15 and 25 and the spaces between the first and second flow passage forming members 15 and 25 and the valve main body 6. Further, the first and second omniseals 120, 130, 140, and 150 are arranged so as to be open toward the first and second pressure applying portions 94 and 96. Further, the first omniseal 120 includes the combination of the spring member 121 made of a metal and the sealing member 122 made of a synthetic resin. Not only the spring member 121 made of a metal but also polytetrafluoroethylene (PTFE), which is a synthetic resin for forming the sealing member 122, is excellent in heat resistance. Thus, the first omniseal 120 is resistant to long time use at a temperature within an ultralow temperature range. This also applies to the other first and second omniseals 130, 140, and 150.

Thus, the three-way motor valve 1 according to the first embodiment of the present invention has improved sealing performance against a fluid having a low temperature of about −85° C. as compared to a case in which the first and second pressure applying portions do not include first and second flow passage forming members, which are members fitted to the valve main body 6 to form the first and second outflow ports 7 and 17, and in which both end portions of each of the first and second flow passage forming members in the longitudinal direction are sealed by the sealing means, which has a substantially U-shaped cross section and is made of a synthetic resin, and is urged in the opening direction by the spring member made of a metal, and the spaces between the first and second valve seat elements 70 and 80 and the first and second flow passage forming members 15 and 25 and the spaces between the first and second flow passage forming members 15 and 25 and the valve main body 6 are sealed by the O-rings.

Specifically, when the spaces between the first and second valve seat elements 70 and 80 and the first and second flow passage forming members 15 and 25 and the spaces between the first and second flow passage forming members 15 and 25 and the valve main body 6 are sealed by using the first and second omniseals 120, 130, 140, and 150, high sealing performance against the fluid having a low temperature of about −85° C. can be achieved. Further, the first and second omniseals 120, 130, 140, and 150 have relatively large contact areas between the first and second valve seat elements 70 and 80 and the first and second flow passage forming members 15 and 25 and between the first and second flow passage forming members 15 and 25 and the valve main body 6. Also in this regard, high sealing performance can be achieved.

Second Embodiment

Figure 16:
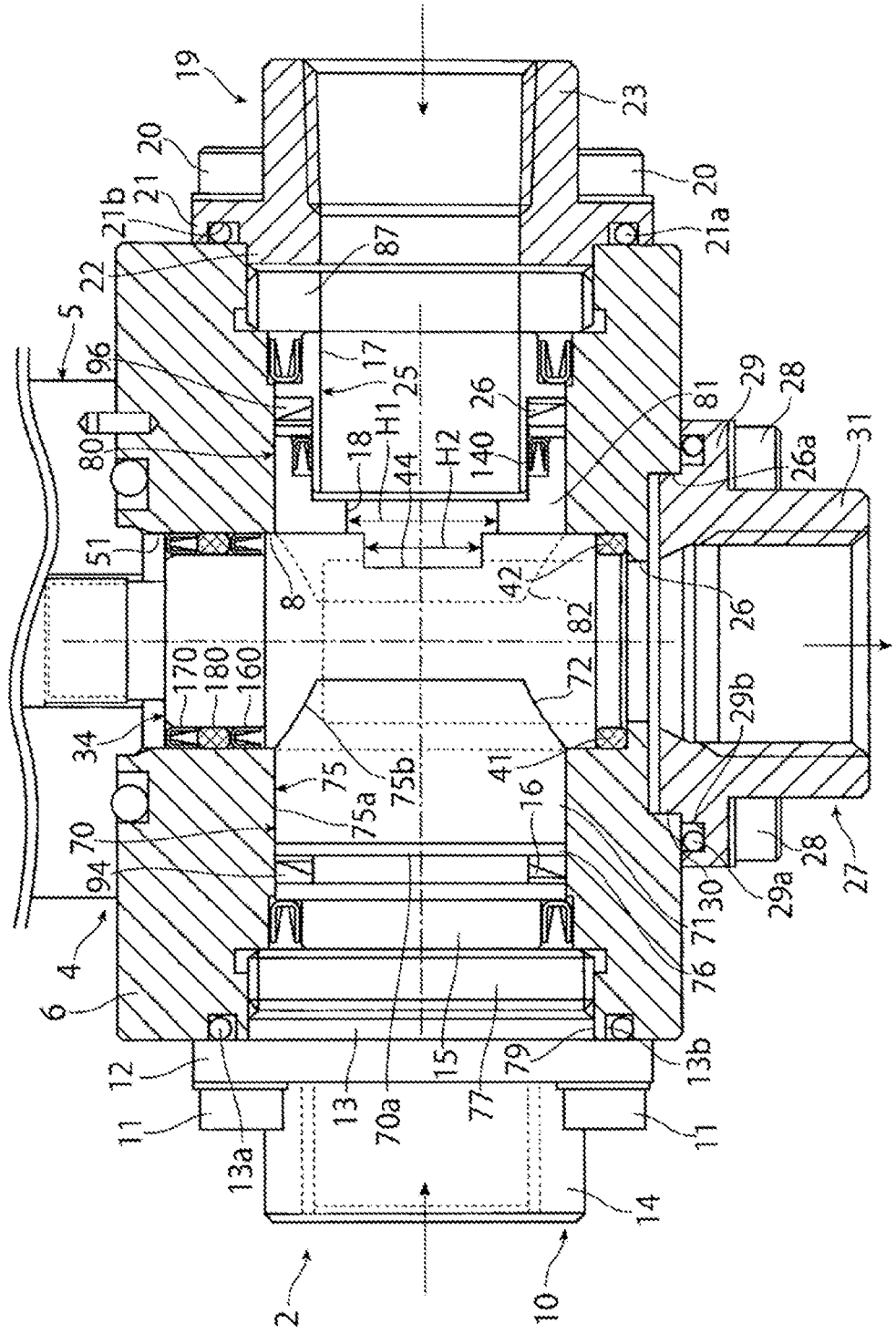
FIG. 16 is a sectional configuration view for illustrating a three-way motor valve as one example of the three-way valve for flow rate control according to a second embodiment of the present invention.

FIG. 16 is a view for illustrating a three-way motor valve as one example of a flow rate control valve according to a second embodiment of the present invention.

The three-way motor valve 1 according to the second embodiment is structured as the three-way motor valve 1 for mixing, which is configured to mix two kinds of different fluids instead of dividing the same fluid into two parts.

As illustrated in FIG. 16, the first inflow port 7 and the first valve port 9 are formed in one side surface of the valve main body 6 of the three-way motor valve 1. The first inflow port 7 allows inflow of a lower temperature fluid as a first fluid. The first valve port 9 has a rectangular cross section, and communicates with the valve seat 8 having a columnar space. In the second embodiment of the present invention, instead of directly forming the first outflow port 7 and the first valve port 9 in the valve main body 6, the first valve port 9 is formed in the first valve seat element 70 as one example of a valve port forming member forming the first valve port 9, and the first inflow port 7 is formed in the first flow passage forming member 15 forming the first inflow port 7. The first valve seat element 70 and the first flow passage forming member 15 are fitted to the valve main body 6, thereby providing the first inflow port 17 and the first valve port 9.

Further, the second inflow port 17 and the second valve port 18 are formed in another side surface of the valve main body 6 of the three-way motor valve 1. The second inflow port 17 allows inflow of a higher temperature fluid as a second fluid. The second valve port 18 has a rectangular cross section, and communicates with the valve seat 8 having a columnar space. In the second embodiment of the present invention, instead of directly forming the second outflow port 17 and the second valve port 18 in the valve main body 6, the second valve port 18 is formed in the second valve seat element 80 as one example of a valve port forming member forming the second valve port 18, and the second outflow port 17 is formed in the second flow passage forming member 25 forming the second outflow port 17. The second valve seat element 80 and the second flow passage forming member 25 are fitted to the valve main body 6, thereby providing the second outflow port 17 and the second valve port 18.

Further, the outflow port 26 is opened in a bottom surface of the valve main body 6 of the three-way motor valve 1. The outflow port 26 allows outflow of a fluid for temperature control, which is a mixture of fluids obtained by mixing the first and second fluids inside the valve main body 6.

Here, the lower temperature fluid as the first fluid and the higher temperature fluid as the second fluid are fluids to be used for temperature control. A fluid having a relatively lower temperature is referred to as "lower temperature fluid," and a fluid having a relatively higher temperature is referred to as "higher temperature fluid." Thus, the lower temperature fluid and the higher temperature fluid represents a relative relationship The lower temperature fluid is not a fluid having an absolutely low temperature, and the higher temperature fluid is not a fluid having an absolutely high temperature. As the lower temperature fluid and the higher temperature fluid, a fluorine-based inert liquid, for example, Opteon (trademark) (manufactured by Chemours-Mitsui Fluoroproducts Co., Ltd.) or Novec (trademark) (manufactured by 3M company) is used at a pressure of from 0 MPa to 1 MPa and within a temperature range of from about −85° C. to about 120° C.

Incidentally, as described above, the three-way motor valve 1 according to the second embodiment of the present invention is structured as the three-way motor valve 1 for mixing, which is configured to mix two kinds of different fluids. Thus, inflow of the first and second fluids, which are different from each other, through the first and second inflow ports 7 and 17 is allowed. Pressures of the first and second fluids flowing to the inside through the first and second inflow ports 7 and 17 are applied to the second omniseals 130 and 150 via the gaps between outer peripheries of first and second adjusting rings 77 and 87 and inner peripheries of the first and second adjusting rings 77 and 87 and the first and second flow passage forming members 15 and 25.

Further, the pressures of the first and second fluids flowing to the inside through the first and second inflow ports 7 and 17 are applied to the first omniseals 120 and 140 via the gaps between the first and second flow passage forming members 15 and 25 and the first and second valve seat elements 70 and 80.

Thus, in the second embodiment of the present invention, the first omniseals 120 and 140 and the second omniseals 130 and 150 are arranged so that openings thereof are located in a direction in which the pressure of the fluid is applied. Specifically, the first omniseals 120 and 140 are arranged so that the openings thereof are located on the inner side of the valve main body 6, and the second omniseals 130 and 150 are arranged so that the openings thereof are located on the outer side of the valve main body 6.

The other configurations and operations are the same as those of the first embodiment described above, and hence description thereof is omitted.

Third Embodiment

Figure 17:
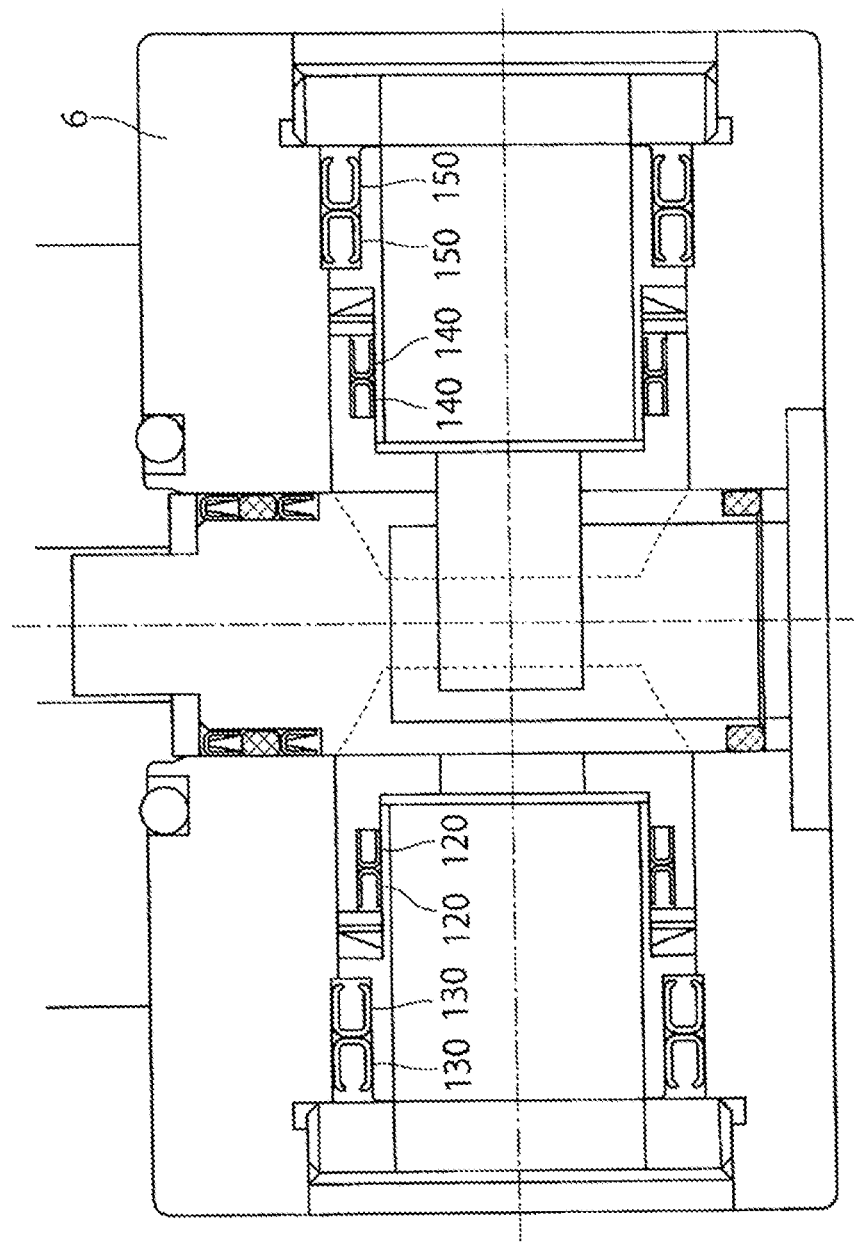
FIG. 17 is a sectional configuration view for illustrating a three-way motor valve as one example of the three-way valve for flow rate control according to a third embodiment of the present invention.

FIG. 17 is a view for illustrating a three-way motor valve as one example of a flow rate control valve according to a third embodiment of the present invention.

The three-way motor valve 1 according to the third embodiment of the present invention is configured so as to be used as both of the three-way motor valve 1 for division and the three-way motor valve 1 for mixing.

As illustrated in FIG. 17, two omniseals are arranged back-to-back for each of first omniseals 120 and 140 and second omniseals 130 and 150 to be fitted to a valve main body 6 so that openings thereof are located on the opposite sides.

Specifically, two omniseals 120 and two omniseals 140 are arranged back-to-back as the first omniseals 120 and 140 so that the openings thereof are located on the inner side and the outer side of the valve main body 6.

Similarly, two omniseals 130 and two omniseals 150 are arranged back-to-back as the two omniseals 120 and 140 so that the openings thereof are located on the inner side and the outer side of the valve main body 6.

The three-way motor valve 1 according to the third embodiment of the present invention can be used for both of the three-way motor valve 1 for division and the three-way motor valve 1 for mixing while having the same configuration.

The other configurations and operations are the same as those of the first embodiment described above, and hence description thereof is omitted.

Example 1

Figure 18:
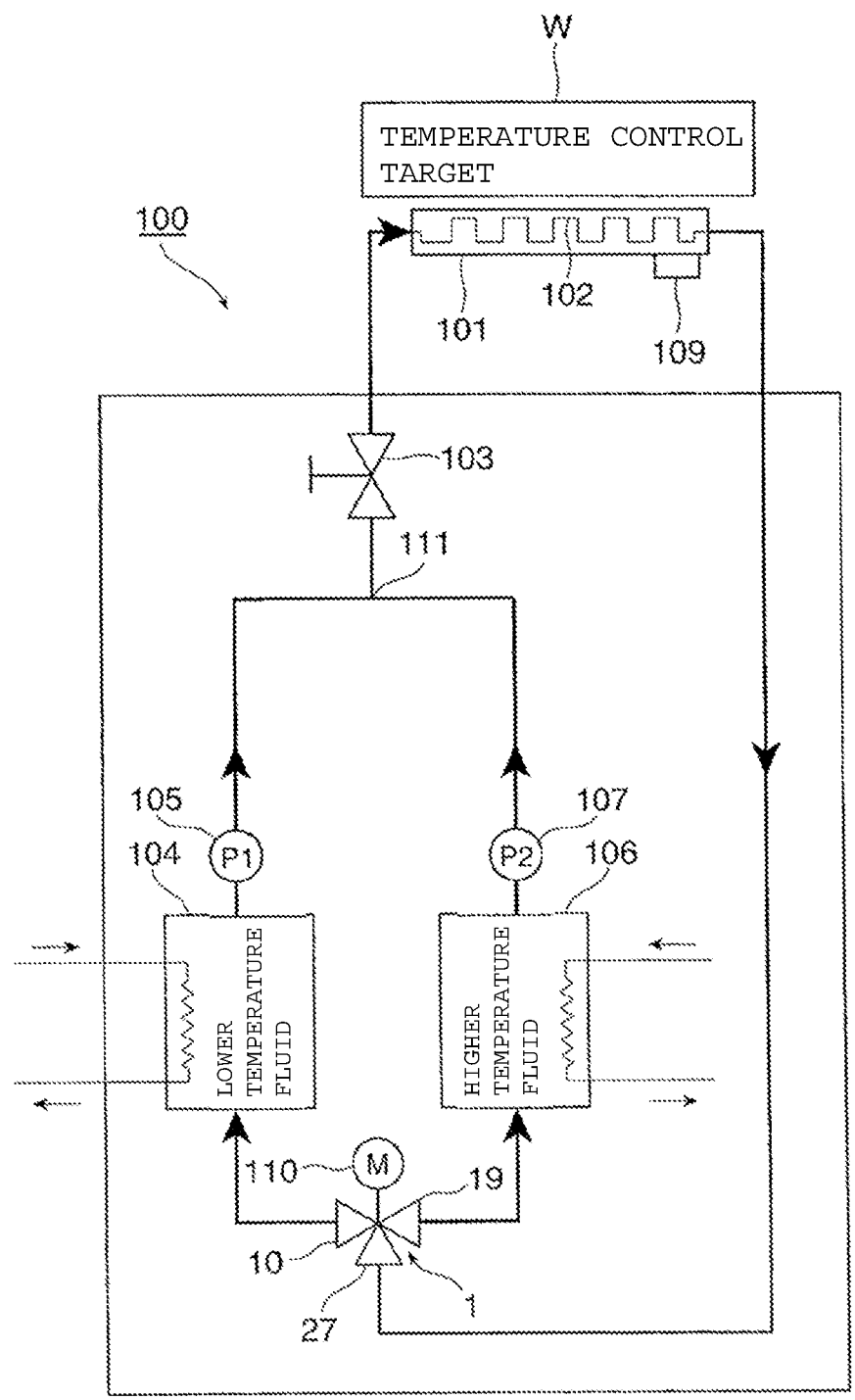
FIG. 18 is a schematic diagram for illustrating a constant-temperature maintaining device (chiller device) to which the three-way motor valve as one example of the three-way valve for flow rate control according to the first embodiment of the present invention is applied.

FIG. 18 is a schematic diagram for illustrating a constant-temperature maintaining device (chiller device) to which the three-way motor valve for flow rate control according to the first embodiment of the present invention is applied.

A chiller device 100 is, for example, used for a semiconductor manufacturing apparatus involving plasma etching, and configured to maintain a temperature of a semiconductor wafer or the like as one example of a temperature control target W to a constant temperature. The temperature control target W, for example, a semiconductor wafer, may rise in temperature along with generation or discharge of plasma or the like after being subjected to plasma etching or the like.

The chiller device 100 includes a temperature control portion 101 constructed to have a table-like shape as one example of the temperature control means arranged so as to be brought into contact with the temperature control target W. The temperature control portion 101 has a flow passage 102 for temperature control therein. The fluid for temperature control, which includes the lower temperature fluid and the higher temperature fluid having been adjusted in mixture ratio, flows through the flow passage 102 for temperature control.

Mixing means 111 is connected to the flow passage 102 for temperature control in the temperature control portion 101 through an open/close valve 103. A constant-temperature reservoir 104 for lower temperature is connected to one side of the mixing means 111. The constant-temperature reservoir 104 for lower temperature stores the low temperature fluid adjusted to a predetermined lower temperature. The lower temperature fluid is supplied to the three-way motor valve 1 from the constant-temperature reservoir 104 for lower temperature by a first pump 105. Further, a constant-temperature reservoir 106 for higher temperature is connected to another side of the mixing means 111. The constant-temperature reservoir 106 for higher temperature stores the high temperature fluid adjusted to a predetermined higher temperature. The higher temperature fluid is supplied to the three-way motor valve 1 from the constant-temperature reservoir 106 for higher temperature by a second pump 107. The mixing means 111 is connected to the flow passage 102 for temperature control in the temperature control portion 101 through the open/close valve 103.

Further, on an outflow side of the flow passage 102 for temperature control in the temperature control portion 101, a pipe for returning is provided. The pipe for returning is connected to the constant-temperature reservoir 104 for lower temperature and the constant-temperature reservoir 106 for higher temperature through the three-way valve 1 for flow rate control for division.

The chiller device 100 uses the three-way motor valve 1 in order to divide a fluid for control, which has flowed through the flow passage 102 for temperature control in the temperature control portion 101, between the constant-temperature reservoir 104 for lower temperature and the constant-temperature reservoir 106 for higher temperature. When the valve shaft 34 is driven to rotate by a stepping motor 110, the three-way motor valve 1 controls a flow rate of the fluid for control to be divided between the constant-temperature reservoir 104 for lower temperature and the constant-temperature reservoir 106 for higher temperature.

As the lower temperature fluid and the higher temperature fluid, a fluorine-based inert liquid, for example, Opteon (trademark) (manufactured by Chemours-Mitsui Fluoroproducts Co., Ltd.) or Novec (trademark) (manufactured by 3M company) is used at a pressure of from 0 MPa to 1 MPa and within a temperature range of from about −85° C. to about 120° C.

In a mixing portion 111 in which the lower temperature fluid supplied from the constant-temperature reservoir 104 for lower temperature by the first pump 105, and the higher temperature fluid supplied from the constant-temperature reservoir 106 for higher temperature by the second pump 107 are mixed together, there is used the mixing means for mixing the lower temperature fluid and the higher temperature fluid as appropriate after controlling the flow rate of the lower temperature fluid and the flow rate of the higher temperature fluid. As a matter of course, as described above, the three-way motor valve 1 for mixing may be used as the mixing means.

Example 2

Figure 19:
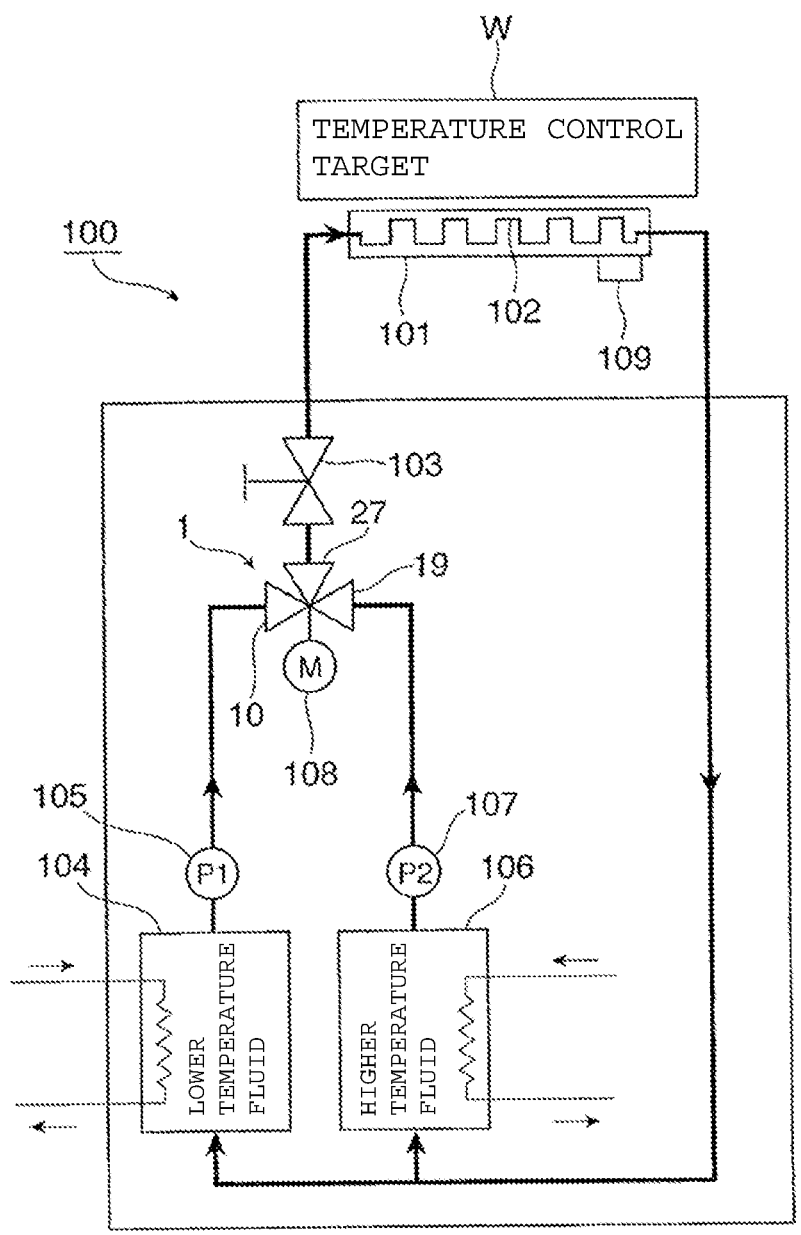
FIG. 19 is a schematic diagram for illustrating a constant-temperature maintaining device (chiller device) to which the three-way motor valve as one example of the three-way valve for flow rate control according to the second embodiment of the present invention is applied.

FIG. 19 is a schematic diagram for illustrating a constant-temperature maintaining device (chiller device) to which the three-way motor valve for flow rate control according to the second embodiment of the present invention is applied.

The three-way motor valve 1 is connected to the flow passage 102 for temperature control in the temperature control portion 101 through an open/close valve 103. A constant-temperature reservoir 104 for lower temperature is connected to the first flange portion 10 of the three-way motor valve 1. The constant-temperature reservoir 104 for lower temperature stores the low temperature fluid adjusted to a predetermined lower temperature. The lower temperature fluid is supplied to the three-way motor valve 1 from the constant-temperature reservoir 104 for lower temperature by a first pump 105. Further, a constant-temperature reservoir 106 for higher temperature is connected to the second flange portion 19 of the three-way motor valve 1. The constant-temperature reservoir 106 for higher temperature stores the high temperature fluid adjusted to a predetermined higher temperature. The higher temperature fluid is supplied to the three-way motor valve 1 from the constant-temperature reservoir 106 for higher temperature by a second pump 107. The third flange member 27 of the three-way motor valve 1 is connected to the flow passage 102 for temperature control in the temperature control portion 101 through the open/close valve 103.

Further, on an outflow side of the flow passage 102 for temperature control in the temperature control portion 101, a pipe for returning is provided. The pipe for returning is connected to the constant-temperature reservoir 104 for lower temperature and the constant-temperature reservoir 106 for higher temperature.

The three-way motor valve 1 includes a stepping motor 108 configured to drive the valve shaft 34 to rotate. Further, a temperature sensor 109 configured to detect a temperature of the temperature control portion 101 is provided to the temperature control portion 101. The temperature sensor 109 is connected to a control device (not shown), and the control device is configured to control a drive of the stepping motor 108 of the three-way motor valve 1.

As illustrated in FIG. 19, in the chiller device 100, a temperature of the temperature control target W is detected by the temperature sensor 109. Based on a detection result obtained by the temperature sensor 109, the rotation of the stepping motor 108 of the three-way motor valve 1 is controlled by the control device. Accordingly, the temperature control target W is controlled to a temperature equal to a predetermined temperature.

When the valve shaft 34 is driven to rotate by the stepping motor 108, the three-way motor valve 1 controls the mixture ratio between the lower temperature fluid, which is supplied from the constant-temperature reservoir 104 for lower temperature by the first pump 105, and the higher temperature fluid, which is supplied from the constant-temperature reservoir 106 for higher temperature by the second pump 107, to control a temperature of the fluid for temperature control, which is a mixture of the lower temperature fluid and the higher temperature fluid to be supplied to the flow passage 102 for temperature control in the temperature control portion 101 from the three-way motor valve 1 through the open/close valve 103.

At this moment, the three-way motor valve 1 is capable of controlling the mixture ratio between the lower temperature fluid and the higher temperature fluid in accordance with the rotation angle of the valve shaft 34 with high accuracy, thereby being capable of finely adjusting a temperature of the fluid for temperature control. Thus, the chiller device 100 using the three-way motor valve 1 according to the embodiment of the present invention is capable of controlling a temperature of the temperature control target W, which is brought into contact with the temperature control portion 101, to a desired temperature, by allowing the fluid for temperature control, which is controlled in mixture ratio between the lower temperature fluid and the higher temperature fluid and adjusted in temperature to a predetermined temperature, to flow through the flow passage 102 for temperature control in the temperature control portion 101.

As the lower temperature fluid and the higher temperature fluid, a fluorine-based inert liquid, for example, Opteon (trademark) (manufactured by Chemours-Mitsui Fluoroproducts Co., Ltd.) or Novec (trademark) (manufactured by 3M company) is used at a pressure of from 0 MPa to 1 MPa and within a temperature range of from about −85° C. to about 120° C.

INDUSTRIAL APPLICABILITY

The three-way valve for flow rate control and the temperature control device, each having improved sealing performance against the fluid having a low temperature of about −85° C., can be provided.

REFERENCE SIGNS LIST

1 . . . three-way motor valve
2 . . . valve portion
3 . . . actuator portion
4 . . . sealing portion
5 . . . coupling portion
6 . . . valve main body
7 . . . first inflow port
8 . . . valve seat
9 . . . first valve port
10 . . . first flange member
11 . . . hexagon socket head cap screw
12 . . . flange portion
13 . . . insertion portion
14 . . . pipe connecting portion
15 . . . first flow passage forming member
16 . . . chamfer
17 . . . second inflow port
18 . . . second valve port
19 . . . second flange member
20 . . . hexagon socket head cap screw
21 . . . flange portion
22 . . . insertion portion
23 . . . pipe connecting portion
25 . . . second flow passage forming member
34 . . . valve shaft
35 . . . valve body portion
45 . . . valve operating portion
45*a*, 45*b* . . . both end portions
70, 80 . . . first and second valve seat element
74, 84 . . . concave portion
120, 130, 140, 150 . . . omniseal

The invention claimed is:

1. A three-way valve for flow rate control, comprising:
a valve main body including:
a valve seat having a columnar space and having a first valve port and a second valve port, the first valve port having a rectangular cross section and allowing outflow of a fluid, the second valve port having a rectangular cross section and allowing outflow of the fluid; and
first and second outflow ports, which allow outflow of the fluid from the first and second valve ports to an outside;
first and second valve port forming members, which are fitted to the valve main body to form the first valve port and the second valve port, respectively;
a valve body having a cylindrical shape and an opening, which is provided in a freely rotatable manner in the valve seat of the valve main body, and simultaneously switches the first valve port from a closed state to an opened state and switches the second valve port from an opened state to a closed state;
a pressure applying portion configured to apply a pressure of the fluid leaking through a gap between the valve body and the valve seat to the first and second valve port forming members so as to suppress shift of a position of the valve body when the valve body opens and closes the first valve port and the second valve port; and drive means for driving the valve body to rotate, wherein the pressure applying portion includes first and second flow passage forming members each having a cylindrical shape, which are members fitted to the valve main body to form the first and second outflow ports, and in which both end portions of each of the first and second flow passage forming members in a longitudinal direction are sealed by sealing means, which has a substantially U-shaped cross section and is made of a synthetic resin, and is urged in an opening direction by a spring member made of a metal, and wherein a pair of the sealing means are arranged on the end portions of one of the first and second flow passage forming members, in a manner where open ends of the pair of the sealing means face the one of the first and second flow passage forming members.

2. The three-way valve for flow rate control according to claim 1, wherein one end portion of each of the first and second flow passage forming members in the longitudinal direction is sealed by first sealing means with respect to an inner surface of each of the first and second valve port forming members, and another end portion of each of the first and second flow passage forming members in the longitudinal direction is sealed by second sealing means with respect to an inner surface of the valve main body.

3. The three-way valve for flow rate control according to claim 2, wherein the one end portion of each of the first and second flow passage forming members in the longitudinal direction has a cylindrical shape having a small thickness and is sealed by the first sealing means with respect to an inner peripheral surface of an end portion of each of the first and second valve port forming members, and the another end portion of each of the first and second flow passage forming members in the longitudinal direction has a cylindrical shape having a thickness larger than the thickness of the one end portion and is sealed by the second sealing means with respect to an inner peripheral surface of the valve main body.

4. The three-way valve for flow rate control according to claim 3, wherein the first sealing means is arranged so as to be open toward the another end portion of each of the first and second flow passage forming members, and the second sealing means is arranged so as to be open toward the one end portion of each of the first and second flow passage forming members.

5. The three-way valve for flow rate control according to claim 4, wherein the first sealing means is arranged in a stepped portion formed in an end surface of each of the first and second flow passage forming members on a side closer to the pressure applying portion, and wherein the three-way valve for flow rate control comprises first and second pressure-receiving plates configured to close the stepped portions formed in the end surfaces of the first and second flow passage forming members on the sides closer to the pressure applying portion to allow the pressure to be applied by the pressure applying portion to the first and second valve port forming members.

6. The three-way valve for flow rate control according to claim 1, wherein the sealing means includes a pair of the same sealing means that are arranged so that synthetic resin portions each having the substantially U-shaped cross section are back-to-back.

7. A temperature control device, comprising:

temperature control means having a flow passage for temperature control, which allows a fluid for temperature control to flow therethrough, the fluid for temperature control including a lower temperature fluid and a higher temperature fluid adjusted in mixture ratio;

first supply means for supplying the lower temperature fluid adjusted to a first predetermined lower temperature;

second supply means for supplying the higher temperature fluid adjusted to a second predetermined higher temperature;

mixing means, which is connected to the first supply means and the second supply means, for mixing the lower temperature fluid supplied from the first supply means and the higher temperature fluid supplied from the second supply means and supplying a mixture of the lower temperature fluid and the higher temperature fluid to the flow passage for temperature control; and a flow rate control valve configured to divide the fluid for temperature control having flowed through the flow passage for temperature control between the first supply means and the second supply means while controlling a flow rate of the fluid for temperature control, wherein the three-way valve for flow rate control of claim 1 is used as the flow rate control valve.

8. A three-way valve for flow rate control, comprising:

a valve main body including:

a valve seat having a columnar space and having a first valve port and a second valve port, the first valve port having a rectangular cross section and allowing inflow of a first fluid, the second valve port having a rectangular cross section and allowing inflow of a second fluid; and first and second inflow ports, which allow inflow of the first fluid and the second fluid to the first and second valve ports from an outside;

first and second valve port forming members, which are fitted to the valve main body to form the first valve port and the second valve port, respectively;

a valve body having a cylindrical shape and an opening, which is provided in a freely rotatable manner in the valve seat of the valve main body, and simultaneously switches the first valve port from a closed state to an opened state and switches the second valve port from an opened state to a closed state;

a pressure applying portion configured to apply pressures of the first and second fluids leaking through a gap between the valve body and the valve seat to the first and second valve port forming members so as to suppress shift of a position of the valve body when the valve body opens and closes the first valve port and the second valve port; and drive means for driving the valve body to rotate, wherein the pressure applying portion includes first and second flow passage forming members each having a cylindrical shape, which are members fitted to the valve main body to form the first and second outflow ports, and in which both end portions of each of the first and second flow passage forming members in a longitudinal direction are sealed by sealing means, which has a substantially U-shaped cross section and is made of a synthetic resin, and is urged in an opening direction by a spring member made of a metal, and wherein a pair of the sealing means are arranged on the end portions of one of the first and second flow passage forming members, in a manner where open ends of the pair of the sealing means face the one of the first and second flow passage forming members.

9. A temperature control device, comprising:

temperature control means having a flow passage for temperature control, which allows a fluid for temperature control to flow therethrough, the fluid for temperature control including a lower temperature fluid and a higher temperature fluid adjusted in mixture ratio;

first supply means for supplying the lower temperature fluid adjusted to a first predetermined lower temperature;

second supply means for supplying the higher temperature fluid adjusted to a second predetermined higher temperature;

a flow rate control valve, which is connected to the first supply means and the second supply means, for flowing, to the flow passage for temperature control, the lower temperature fluid supplied from the first supply means and the higher temperature fluid supplied from the second supply means while adjusting the mixture ratio thereof, wherein the three-way valve for flow rate control of claim 8 is used as the flow rate control valve.

\* \* \* \* \*